(12) United States Patent
Prelewitz et al.

(10) Patent No.: US 7,282,716 B2
(45) Date of Patent: Oct. 16, 2007

(54) DIGITAL IMAGING ASSEMBLY AND METHODS THEREOF

(75) Inventors: David Prelewitz, Rochester, NY (US);
Robert Gray, Rochester, NY (US);
Rolf Gerchberg, Rochester, NY (US);
Michael Weiner, Webster, NY (US)

(73) Assignees: Technology Innovations, LLC, Pittsford, NY (US); Wavefront Analysis, Inc., Ardsley, NY (US)

( * ) Notice: Subject to any disclaimer, the term of this patent is extended or adjusted under 35 U.S.C. 154(b) by 232 days.

(21) Appl. No.: 10/983,053

(22) Filed: Nov. 5, 2004

(65) Prior Publication Data
US 2005/0167595 A1 Aug. 4, 2005

Related U.S. Application Data

(60) Provisional application No. 60/518,918, filed on Nov. 10, 2003.

(51) Int. Cl.
*G01J 5/02* (2006.01)
*G02B 21/06* (2006.01)
*G01B 9/02* (2006.01)
*G01B 11/02* (2006.01)

(52) U.S. Cl. .............................. 250/370.08; 250/208.1; 250/341.1; 250/370.08; 356/483; 356/497; 359/385

(58) Field of Classification Search ........... 250/370.08, 250/370.09, 370.11, 458.1, 461.1, 341.1, 250/208.1; 356/521, 486, 477, 483, 497, 356/385, 245, 214, 100
See application file for complete search history.

(56) References Cited

U.S. PATENT DOCUMENTS 3,764,897 A 10/1973 Greenwood
4,012,689 A 3/1977 Cox (Continued)

*Primary Examiner*—David Porta
*Assistant Examiner*—Faye Boosalis
(74) *Attorney, Agent, or Firm*—Buchanan Ingersoll & Rooney PC

(57) ABSTRACT

A coherent radiation imaging system that produces digital images with a reduced amount of speckle. Radiation from a long coherence length source is used to form an image of a sample. The output coherent wave is temporally divided into a plurality of wavelets. The spatial phase of each wavelet is then modulated a known and different amount. Each phase modulated wavelet illuminates the sample and is perturbed by its interaction with the sample. A spatial phase map of each perturbed wavelet is then created and converted to a sample image with an image reconstruction program. The plurality of sample images thus formed is statistically averaged to form a final averaged image. The high frequency speckle that is not optically resolvable tends to average to zero with continual statistical averaging, leaving only the optically resolvable lower frequency phase information.

45 Claims, 19 Drawing Sheets

U.S. PATENT DOCUMENTS

| | | | |
|---|---|---|---|
| 4,142,773 A | 3/1979 | Avramenko | |
| 4,265,541 A * | 5/1981 | Leclerc et al. | 356/460 |
| 4,396,289 A | 8/1983 | Fantone | |
| 4,420,218 A | 12/1983 | Rubanov | |
| 4,732,483 A | 3/1988 | Biegen | |
| 4,831,629 A | 5/1989 | Paoli | |
| 4,868,803 A | 9/1989 | Sunagawa | |
| 4,869,593 A | 9/1989 | Biegen | |
| 4,921,352 A | 5/1990 | Adolfs | |
| 4,936,665 A | 6/1990 | Whitney | |
| 4,961,618 A | 10/1990 | Jordan | |
| 4,975,237 A | 12/1990 | Watling | |
| 5,037,202 A | 8/1991 | Batchelder | |
| 5,070,488 A | 12/1991 | Fukushima | |
| 5,136,532 A * | 8/1992 | Lefevre | 708/801 |
| 5,153,860 A | 10/1992 | Sunagawa | |
| 5,218,584 A | 6/1993 | Gfeller | |
| 5,225,668 A | 7/1993 | Hilliard | |
| 5,309,907 A | 5/1994 | Fang | |
| 5,321,718 A | 6/1994 | Waarts | |
| 5,361,131 A * | 11/1994 | Tekemori et al. | 356/499 |
| 5,363,226 A | 11/1994 | Strasser | |
| 5,365,243 A | 11/1994 | Buchler | |
| 5,392,271 A | 2/1995 | Matsui | |
| 5,457,533 A | 10/1995 | Wilcken | |
| 5,469,261 A | 11/1995 | Hellmuth | |
| 5,481,516 A | 1/1996 | Kim | |
| 5,485,277 A | 1/1996 | Foster | |
| 5,534,970 A | 7/1996 | Nakashima | |
| 5,541,608 A | 7/1996 | Murphy | |
| 5,596,409 A | 1/1997 | Marcus | |
| 5,612,818 A | 3/1997 | Kumagai | |
| 5,623,360 A * | 4/1997 | Gesell et al. | 359/287 |
| 5,754,511 A | 5/1998 | Gemma | |
| 5,763,789 A | 6/1998 | Ettemeyer | |
| 5,789,829 A | 8/1998 | Heesemann | |
| 5,923,425 A | 7/1999 | Dewa | |
| 5,963,626 A | 10/1999 | Nabkel | |
| 5,978,109 A | 11/1999 | Kato | |
| 6,002,499 A | 12/1999 | Corboline | |
| 6,055,044 A | 4/2000 | Uchiyama | |
| 6,094,300 A | 7/2000 | Kashima | |
| 6,160,824 A | 12/2000 | Meissner | |
| 6,215,928 B1 | 4/2001 | Friesem | |
| 6,272,095 B1 | 8/2001 | Liu | |
| 6,304,330 B1 * | 10/2001 | Millerd et al. | 356/521 |
| 6,323,984 B1 * | 11/2001 | Trisnadi | 359/245 |
| 6,365,932 B1 | 4/2002 | Kouno | |
| 6,369,932 B1 | 4/2002 | Gerchberg | |
| 6,385,157 B1 | 5/2002 | Nakano | |
| 6,424,449 B1 | 7/2002 | Namiki | |
| 6,430,328 B1 | 8/2002 | Culver | |
| 6,432,292 B1 | 8/2002 | Pinto | |
| 6,480,272 B1 | 11/2002 | Rock | |
| 6,490,045 B1 * | 12/2002 | Dakin et al. | 356/483 |
| 6,538,791 B2 | 3/2003 | Trezza | |
| 6,538,800 B2 | 3/2003 | Huibers | |
| 6,545,790 B2 | 4/2003 | Gerchberg | |
| 6,546,163 B2 | 4/2003 | Thackara | |
| 6,552,777 B2 | 4/2003 | Sunagawa | |
| 6,563,167 B2 | 5/2003 | Chern | |
| 6,567,163 B1 | 5/2003 | Sandstrom | |
| 6,577,429 B1 | 6/2003 | Kurtz | |
| 6,587,194 B2 | 7/2003 | Karpol | |
| 6,624,756 B1 | 9/2003 | Butterworth | |
| 6,630,833 B2 | 10/2003 | Scott | |
| 6,687,008 B1 * | 2/2004 | Peale et al. | 356/477 |
| 2006/0227331 A1 * | 10/2006 | Vollmer et al. | 356/483 |

* cited by examiner

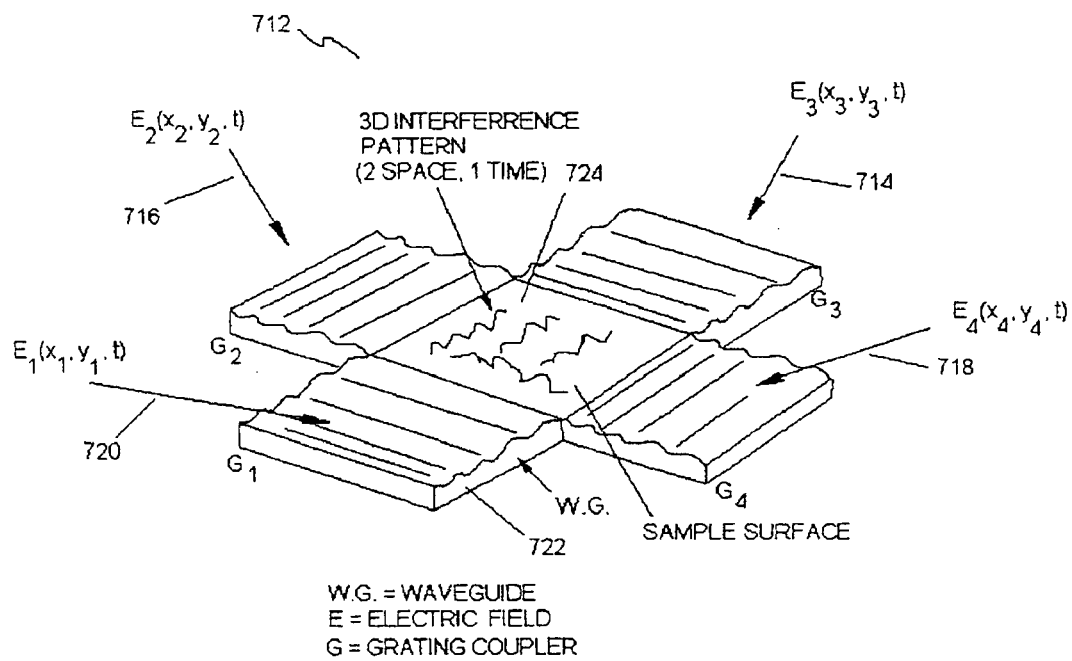
Figure 4-C

"$\Delta t$" must be large enough to acquire the optical phase of the scattered and/or diffracted light at the detector for each $E_n(x, y, t_n)$.

"$\Delta E_n(\Delta x_i, \Delta y_j, t_n)$" must be less than $d_{airy}/M$

"$\Delta E_n(\Delta x_i, \Delta y_j, t_n)$", for all i and j within an object region "$d_{airy}/M$" must have different coherent volumes.

OTHER COHERENT
VOLUME VARIATIONS n ≥ 1 COHERENT THREADS MAY
BE ADDED

DIGITAL IMAGING ASSEMBLY AND METHODS THEREOF

CROSS-REFERENCE TO RELATED APPLICATIONS

This application claims the benefit of U.S. Provisional Application No. 60/518,918 filed Nov. 10, 2003.

FIELD OF THE INVENTION

This invention relates in general to imaging systems, and more particularly to a coherent radiation imaging system that produces digital images with a reduced amount of speckle.

BACKGROUND OF THE INVENTION

In the field of imaging science, nothing is more challenging than imaging the world of the very small. Since the first microscopes, scientists have been fascinated with this instrument and, from its use, new discoveries and solutions to both new and old problems are made practically every day. Overall, it can be argued that microscopes have had the greatest influence in the areas of biology and medicine.

Microscope designs have stayed fairly constant over time. If one were to go into a laboratory today and dissect a modern optical microscope into its basic parts, he would find the same items that have existed in microscopes since their initial creation.

A typical optical microscope consists of a light source, a high power optical objective, a microscope body, and an eyepiece.

Nowadays the eyepiece is often replaced with a focusing lens and an electronic camera that contains an area sensor. In the history of microscopy, this fact has been a major advancement, where the human eye and sketchpad have been replaced with electronic cameras and computer aided imaging analysis.

Additional advancements have also taken place in the illuminator as well. Lasers, in conjunction with fluorescence markers, have significantly improved biologic microscopic imaging. Some of the most advanced systems involve some form of fluorescent spectroscopic imaging where laser energy is used as a narrow-band optical pump. A laser scanning confocal microscope is one such device.

For a microscope to perform well, high magnification, high contrast, and good resolution are needed. To attain this, the microscopic objective needs to have a large numerical-aperture (NA). This fact contributes to a basic limitation in most optical microscopes because having a large NA is done at the expense of reducing the operational focus range or depth-of-focus (DOF).

Visualizing a lens as an interferometer can help put this into perspective. Essentially, large NA optical systems capture highly diffracted object-generated photons with a lot of spatial information. Diffraction is fundamentally a quantum uncertainty process where the more a photon becomes localized by an object particle the more its position becomes uncertain. Hence, capturing and understanding more of a photon's diffracted information better defines the object that caused the photon to diffract in the first place. Additionally, the more a photon is localized by a particle, and consequently diffracted, the less coherent it becomes with its neighbor photons that are not so highly localized or diffracted.

Given that contrast is a function of coherence, in large NA systems out-of-focus image features will tend to blur because over a given optical statistical average, there is a higher collected ratio of incoherent to coherent photons. In essence, as you step more out-of-focus the statistical average is increasingly overwhelmed by incoherent photons, which leads to a fall off in contrast. Put another way, as NA becomes larger, contrast and associated image quality degrade more with focus error. This condition is in comparison to an optical system with the same magnification but with a smaller NA.

In short, high magnification large NA microscopes tend to have a very small DOF. Given that the microbiologic world exists and functions in a 3 dimensional space, this optical reality can be a significant challenge to any scientist. As a result, much has been invested recently, in both effort and money, to alleviate this issue.

Part of the problem is fundamental to what a geometrical optical system does with broadband light (i.e., white light). Actually, the fact that glass optics work as well as they do is a gift from nature. The fact that you can combine a few glass types, with simple spherical surface geometries, and create a quality imaging system that instantaneously and statistically integrates trillions upon trillions of remotely diffracted photons of many different energies, and doing so in-phase to within a small fraction of a wavelength, is truly an amazing thing. For intensity based imaging (which most imaging is), this process of statistical averaging works well. However, if you are interested in capturing the true phase of the photons that enter the imaging system, this method is totally unsatisfactorily.

Phase is a key property of light. Knowing the relative phase distribution (spatially and temporally) of coherently diffracted photons provides us with direct knowledge of an object's existence in four-dimensional space (three spatial dimensions and one time dimension).

Currently, one of the best commercial microscopic systems is a high-speed laser scanning, near-IR (NIR) 2-photon absorption confocal microscope, with a fast z-scanning (DOF scanning) platform or objective. This system uses 2-photon absorption fluorescent imaging to reduce background noise. These systems are very expensive, costing more than $100,000 per unit. Other microscope technologies (research grade) are exploring the use of ultra-wideband-light and near-field imaging to greatly enhance resolution. More sophisticated models can sell for up to $1,000,000 per unit.

Of these systems, none preserve the phase information of the light that is used in the imaging process. Traditionally, one needs sufficient time to measure the phase information, which means using long coherence illumination sources like a highly stabilized mode-locked laser. Here, the laser is used for direct illumination, unlike fluorescent imaging where a laser excites a secondary incoherent light source. With a long coherence illumination source, interferometric and holographic imaging are possible. However, such illumination will often result in poor image quality. Lasers, though great at enabling the determination of the phase information, can produce very poor image quality because of specular noise (typically referred to as speckle).

As is known to those skilled in the art, speckle is a phenomenon in which the scattering of light from a highly coherent source (such as a laser) by a rough surface or inhomogeneous medium generates a random intensity distribution of light that gives the surface or medium a granular appearance. Reference may be had, e.g., to page 1989 of the McGraw-Hill Dictionary of Scientific and Technical Terms, Sixth Edition (McGraw-Hill Book Company, New York, N.Y., 2003). Reference also may be had, e.g., to U.S. Pat. No. 6,587,194, the entire disclosure of which is hereby incorporated by reference into this specification.

As disclosed in U.S. Pat. No. 6,587,194: "A comprehensive description of speckle phenomena can be found in T. S. McKechnie, Speckle Reduction, in Topics in Applied Physics, Laser Speckle and Related Phenomena, 123 (J. C. Dainty ed., 2d ed., 1984) (hereinafter McKechnie). As discussed in the McKechnie article, speckle reduction may be achieved through reduction in the temporal coherence or the spatial coherence of the laser light. There have been various attempts over the years to reduce or eliminate speckle. Another article, citing the above-mentioned McKechnie article and addressing the same issues, B. Dingel et al., Speckle reduction with virtual incoherent laser illumination using a modified fiber array, Optik 94, at 132 (1993) (hereinafter Dingel), mentions several known methods for reducing speckle based on a time integration basis, as well as based on statistical ensemble integration."

By way of further illustration, the speckle phenomenon is described at page 356 of Joseph W. Goodman's "Statistical Optics" (John Wiley & Sons, New York, N.Y., 1985), wherein it is disclosed that: "Methods for suppressing the effects of speckle in coherent imaging have been studied, but no general solution that eliminates speckle while maintaining perfect coherence and preserving image detail down to the diffraction limit of the imaging system has been found." The present invention provides such a "general solution."

The amount of speckle in an image may be measured in accordance with the equation set forth at page 355 of the aforementioned Goodman text (see equation 7.5-14). Reference also may be had, e.g., to U.S. Pat. No. 5,763,789 which discloses and claims: "A method for enlargement of a range of measurement of speckle measuring systems for measurement of elongation of a sample in a testing machine, comprising the steps of: providing a speckle sensor and a loading device; loading the sample into the loading device in the testing machine; and moving the speckle sensor in correspondence with a movement of the sample on the loading thereof such that a center of the field of measurement of the sample is at all times at the same object point on the loading and displacement of the sample." The entire disclosure of this United States patent is hereby incorporated by reference into this specification.

The phase of the digital image may be calculated in accordance with the equation:

$$\overline{\zeta}_i(v_U, v_V) = (\overline{I}_i)^2 \Big[ \delta(v_U, v_V) + (\overline{\lambda} \cdot z_2)^2 \int_{-\infty}^{\infty} \int |\hat{P}(x, y)|^2 |\hat{P}(x - \overline{\lambda} \cdot z_2 v_U, y - \overline{\lambda} \cdot z_2 v_V)|^2 dx \cdot dy \Big]$$

wherein the various variables are defined in equation 7.5-14 of page 354 of Joseph W. Goodman's "Statistical Optics," supra.

This phase, and devices or systems for measuring it, are well known. Reference may be had, e.g., to U.S. Pat. Nos. 5,541,608, 5,225,668, 4,012,689, 5,037,202, 5,789,829, 6,630,833, 3,764,897, and the like. The entire disclosure of each of these United States patent applications is hereby incorporated by reference into this specification.

As is well known to those skilled in the art, there are many companies who perform analytical services that may be utilized in making some or all of the measurements described in this specification. Thus, for example Wavefront Sciences Company of 14810 Central Avenue, S.E., Albuqurque, N. Mex. provides services including "simultaneous measurement of intensity and phase."

Alternatively, or additionally analytical devices that are commercially available such as, e.g., the "New View 200" interferometer available from the Zygo corporation of Middlefield, Conn.

Speckle exists in incoherent imaging as well, but over the statistical block of time that an image is formed, specular artifacts are completely averaged away. This happens very quickly, on the order of femto-seconds. However, with statistical elimination of speckle, phase information is lost as well.

What is needed is time to measure the point-to-point imaged optical phase, before it's destroyed, while in the process, providing sufficient statistical information, whereby speckle is no longer an issue.

U.S. Pat. No. 5,361,131 of Tekemori et al. discloses and claims:"1. An optical displacement measuring apparatus for optically measuring a displacement amount of an object, comprising: image forming means for forming at least a first image indicative of a position of an object at a first time instant and a second image indicative of a position of the object at a second time instant; first modulating means for receiving at least the first and second images and for modulating coherent light in accordance with the first and second images, a relative position between the first image and the second image representing a displacement amount of the object achieved between the first time instant and the second time instant; first Fourier transform means for subjecting the coherent light modulated by said first modulating means to Fourier transformation to thereby form a first Fourier image; second modulating means for receiving the first Fourier image and for modulating coherent light in accordance with the first Fourier image; second Fourier transform means for subjecting the coherent light modulated by said second modulating means to Fourier transformation to thereby form a second Fourier image; detecting means for detecting a position of the second Fourier image which is indicative of the displacement amount of the object attained between the first and second time instants, said detecting means including a position sensitive light detector for receiving the second Fourier image and for directly detecting the position of the second Fourier image; and time interval adjusting means for adjusting a time interval defined between the first and second time instants, said time interval adjusting means adjusting the value of the time interval so as to cause the second Fourier image to be received by the position sensitive light detector."

The device of the Tekemori et al. patent is not capable of eliminating specular noise in an image. The present invention can provide a digital image with a reduced amount of speckle.

SUMMARY OF THE INVENTION

The method of the present invention is a process of controlled statistical processing, where speckle noise can be effectively eliminated while preserving object phase. Essentially, a process is employed where dynamic phase information is encoded onto the illuminating coherent beam, and measured, before input coherence is lost. Given the current availability of very stable and long coherence length lasers (with line widths on the order of 1 kHz), high-speed imaging, and high-speed phase processing; the realization of phase-controlled statistics is now possible.

In the method of the present invention radiation from a long coherence length source is used to form an image of a sample. The output coherent wave is temporally divided into a plurality of wavelets within one coherence length. The spatial phase of each wavelet is then modulated with a spatial phase modulator. The spatial phase of each wavelet is modulated a different and known amount. Each phase modulated wavelet illuminates the sample and is perturbed by its interaction with the sample. A spatial phase mapping of each perturbed wavelet is then measured and the resulting data is converted to an image of the sample by a computer programmed with an image reconstruction algorithm. The plurality of images thus formed is statistically averaged to form a final image. The high frequency speckle, which is not optically resolvable, tends to average to zero with continual statistical averaging, leaving only the optically resolvable lower frequency phase information.

One microscope embodiment of this invention complete phase and amplitude information is preserved, allowing one to observe objects in three-dimensional space, and to recreate and scale imaged samples using computer readable digital holograms.

In another embodiment, the present invention allows one to achieve phase contrast edge enhancement. In one aspect of this embodiment, one utilizes object slices of a biological structure that are mostly suspended in an aqueous environment. In this aspect, light tends to go through (in transmission), occasionally being scattered and diffracted, with little absorption. This essentially describes a phase object. This is one of the reason fluorescent dye markers are so popular with these objects in that they absorb a lot of light and, thus, render them easier to see. Phase contrast, on the other hand, uses small shifts in relative optical phase (which is on the order of a fraction of a wavelength) to see features of the object. This results in a much more sensitive and less imposing way to see things compared to absorptive imaging, which requires a foreign contrast agent to be applied; the foreign contrast agent often does harm to the biological sample.

In another embodiment, non-destructive cellular interaction (in vivo) is achieved; thus, no fluorescent dyes or markers are required. Secondary organic or inorganic marking components, added to enhance imaging, can and do interfere or change biological processes, and in a worse-case scenario, kills the biological sample under investigation via optical bleaching.

In another embodiment, the present invention allows one to achieve high-speed imaging for observing biological processes in real time; thus, e.g., one may observe cellular, dynamic processes, in digital form, to enable automated analytics.

In another embodiment, the present invention allows one to obtain less than 0.1 micron imaging resolution (less than the Raleigh defined resolution limit) using low energy photons (such as, e.g., photons in the visible range between 700 and 400 nanometers). One microscope in accordance with embodiments of the present invention includes a resolution system that obtains a resolution down to 50 nanometers. This microscope utilizes the phase of the light which is determined opto-electronically, in discreet coherent steps. After a coherent step, the optical statistics are changed in a highly controlled and pre-determined fashion and the phase is determined again. This is done repeatedly until one has attained enough information to remove speckle. By controlling the optical statistics in time, one can build up a quality image without the limitations of other optical microscopes.

Today, there are limitations to what can be done with optical microscopic imaging; these limitations are created, at least in part, due to the material limitations of glass optics. Producing large NA objectives is very difficult, and industry is now pushing the limits of glass technology. With the approach disclosed herein, individual optical systems can be brought together, and in-phase. This is made possible by combining optics, electronics, and computing in a new way as disclosed herein.

The microscopes disclosed in this patent application will allow direct and natural visuals of three-dimensional interacting proteins and internal cellular dynamics in their natural state. Additionally, this technology can be extended to other medical imaging devices as well, such as endoscopes.

This invention enables new detailed imaging of live cells and will provide new insights into how both healthy and diseased cells function, and how cellular signaling and transduction works.

Currently, it is not possible to optically observe a living cell, while in its natural state, and observe the 4-dimensional (space and time) dynamic biological processes that the cell performs. Many processes, such as DNA activity, are assumed or inferred with static observational fragments and simulated models. For instance, DNA analysis using X-ray crystallography requires first killing the cell. PCR and other activities require removing the DNA from the cell and adding chemicals to it.

The limitations of current optical microscopes as described above are not present in the herein disclosed microscope.

BRIEF DESCRIPTION OF THE DRAWINGS

The invention will be described by reference to the following drawings, in which like numerals refer to like elements, and in which:

FIG. 4C is a schematic diagram of a multiple diffraction grating coupler;

DETAILED DESCRIPTION OF THE INVENTION

Figure 1:
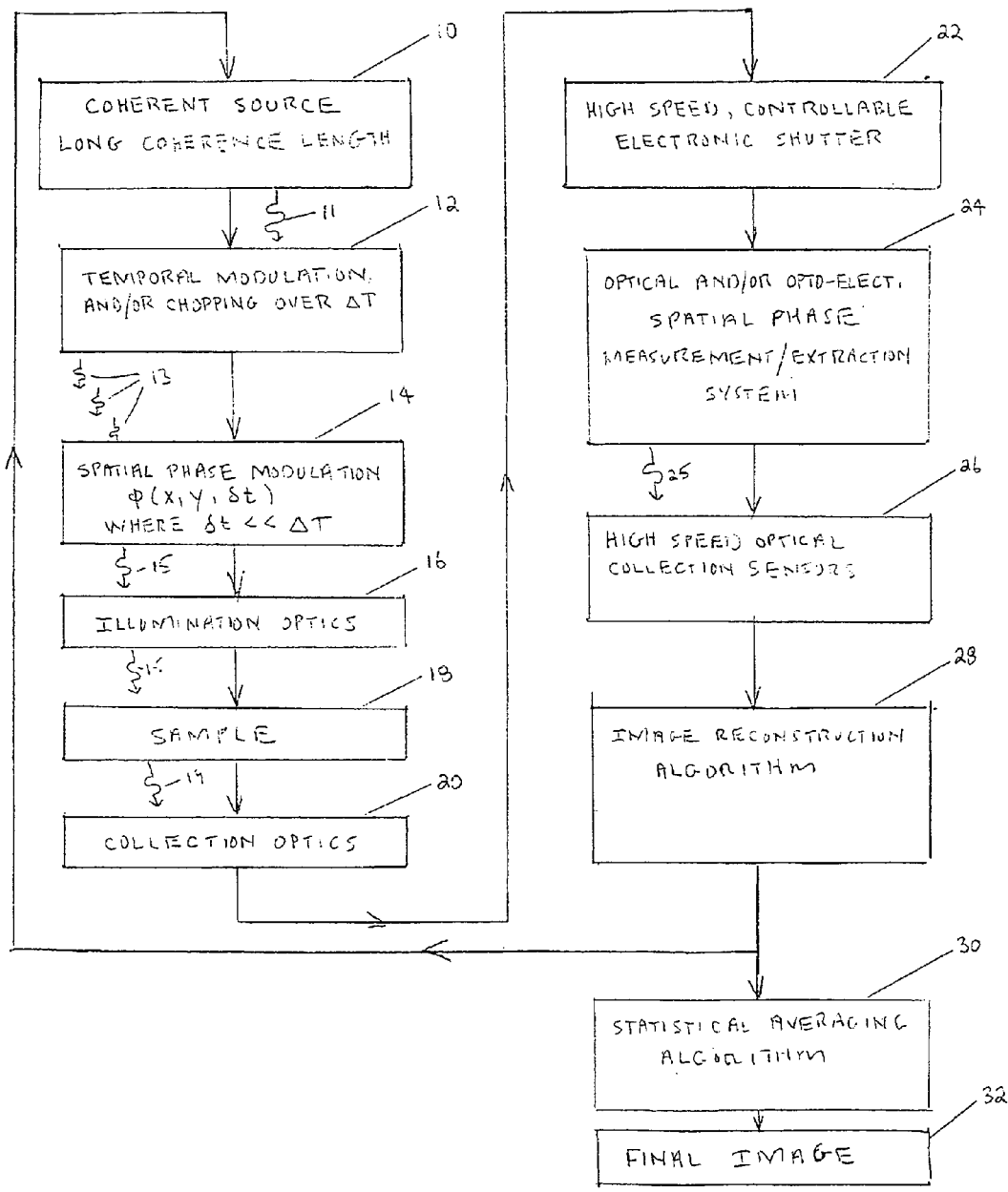
FIG. 1 is a block diagram of the method of the invention.

FIG. 1 is a block diagram illustrating the method of the present invention. A source of coherent radiation 10 provides the coherent wave 11 of radiation to be used to image the sample 18. As used in this specification, the term "coherent radiation" means electromagnetic radiation of the same, or almost the same, wavelength, and with definite phase relationships between different points in the field. See, e.g., page 423 of the "McGraw-Hill Dictionary of Scientific and Technical Terms," Sixth Edition (New York, N.Y., 2003). Reference may also be had, e.g., to U.S. Pat. Nos. 6,272,095, 6,094,300, 6,055,044, 6,002,499, 5,963,626, 5,754,511, and the like. The entire disclosure of each of these United States patents is hereby incorporated by reference into this specification.

The processes embodied in the present invention are not limited to a specific wavelength range of the coherent radiation. At one time the word "light" referred only to the visible spectrum, roughly from 400 nm to 700 nm, but advances in both short-wave and long-wave sensor and optical materials have altered this convention. The words "optics" and "light" will be used extensively in this specification but should not be inferred to imply a specific wavelength range. Recently electromagnetic radiation in the range of 30 to 1000 μm has shown promise for useful applications.

As is known to those skilled in the art, there are two measures of coherence: temporal coherence, and spatial coherence. As is disclosed at page 157 of Joseph W. Goodman's "Statistical Optics" (John Wiley & Sons, New York, N.Y., 1985), ". . . it is . . . worth briefly mentioning the distinction between two types of coherence, temporal coherence and spatial coherence. When considering temporal coherence, we are concerned with the ability of a light beam to interfere with a delayed (but not spatially shifted) portion of itself. We refer to such portioning of a light beam as amplitude splitting. On the other hand, when considering spatial coherence we are concerned with the ability of a light beam to interfere with a spatially shifted (but not delayed) portion of itself. We refer to this type of portioning of light as wavefront splitting.

Many United States patents discuss these types of coherence. For a discussion of temporal interference, reference may be had, e.g., to U.S. Pat. No. 5,469,261 (measurement of lens characteristics), U.S. Pat. No. 4,936,665 (high-resolution imagery systems and methods), U.S. Pat. No. 4,869,593 (interferometric surface profiler), U.S. Pat. No. 4,831,629 (incoherent, optically coupled laser arrays), U.S. Pat. No. 6,577,429 (laser projection display system), and the like. The disclosure of each of these United States patents is hereby incorporated by reference into this specification.

If a wave is combined with a delayed copy of itself, the duration of the delay over which it produces visible interference is known as the "coherence time", $\Delta t$. From this, a corresponding "coherence length" can be calculated as $\Delta l = c \Delta t$, where c is the speed of the wave. See, e.g., page 423 of the "McGraw-Hill Dictionary of Scientific and Technical Terms," Sixth Edition (New York, N.Y., 2003).

In order for this coherent speckle mitigation process to work, a highly coherent light is required. Just how much illumination coherence that is required will (primarily) depend on the phase measuring camera frame rate. This assumes that capturing a frame will be slower than all other temporal processes. As an example, lets assume that we'd like to perform at least 20 controlled statistical averages over the coherence time. Given a laser with a 1 kHz line-width, the coherence time is: $\tau_c = (1 \cdot kHz)^{-1} = 1 \cdot ms$, which gives a coherence length of: $\lambda_c = c \cdot \tau_c = 300$ km. Hence, the camera needs a minimum capture frame rate of: $FR = 20/\tau_c = 20,000$ fps. Such cameras are currently available by various companies.

For a discussion of spatial coherence, reference may be had, e.g., to U.S. Pat. Nos. 5,923,425 (grazing incidence interferometry), U.S. Pat. Ser. No. 5,534,970 (scanning exposure device), U.S. Pat. Nos. 4,420,218, 4,936,665, 4,732,483 (interferometric surface profiler), U.S. Pat. No. 4,396,289, and the light. The entire disclosure of each of these United States patents is hereby incorporated by reference into this specification.

Many coherent light sources are described in the United States patent literature. Reference may be had, e.g., to U.S. Pat. Nos. 5,321,718, 5,309,907, 6,424,449, 5,978,109, 5,596,409, 4,142,773, 6,480,272, 4,921,352, and the like. The disclosure of each of these United States patents is hereby incorporated by reference into this specification.

As is well known to those skilled in the art, coherent light sources are readily commercially available. Thus, and referring to the 1999 Melles Griot catalog (published by Melles Griot Inc.), one may use a "Stabilized Helium Neon Laser Systems for Research" assembly that is discussed on page 44.11 of such catalog. In one embodiment, the coherent source 10 in FIG. 1 is a laser light source that is capable of operating in a single longitudinal mode, and in a single transverse mode.

Referring again to FIG. 1, in the method of the present invention, in the step represented by block 12, the radiation from source 10 is temporally divided into a plurality of wavelets 13 within one coherence time $\Delta t$, each wavelet occupying a sequential time interval $\delta t$ which is a fraction of the coherence time $\Delta t$. In the step represented by block 14, the spatial phase of each wavelet 13 is modulated a different and known amount by a spatial phase modulator.

Figure 2A:
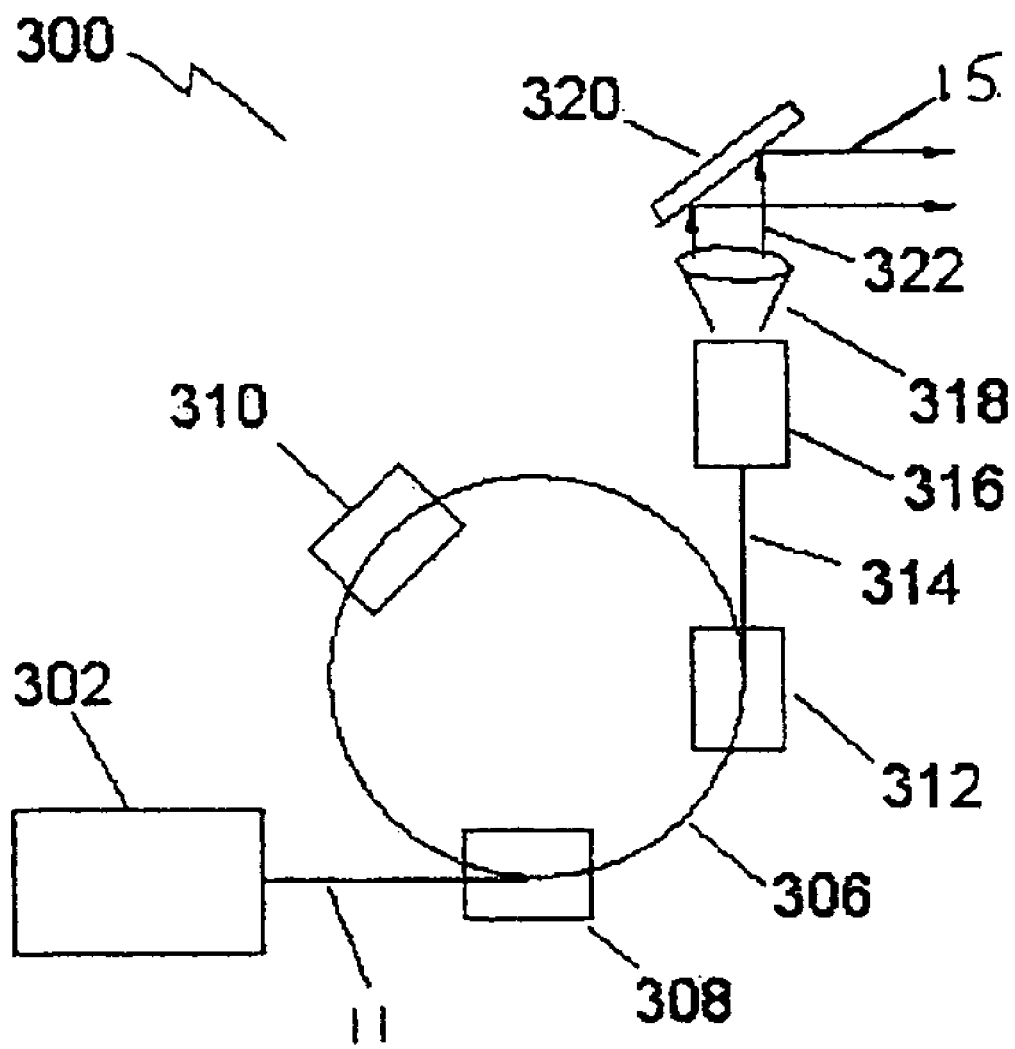
FIG. 2A is a schematic component diagram a coherent light source system in accordance with embodiments of the invention.

FIG. 2A is a schematic component illustration of one physical embodiment for implementing blocks 10-14 of FIG. 1. A laser 302 is used as the coherent radiation source. Laser 302 is such that it has a sufficiently large coherence volume such that the phase can be determined for a minimum resolvable object element as defined by the opticals of the device. The laser-generated light 11 is fed into a delay line 306 by the input component 308. The input component 308 is an electronically controlled fiber optical coupler. The delay line 306 is long optical fiber line (race-track), where coherence, phase, and polarization information are preserved. Reference may be had, e.g., to the website http://www.ozoptics.com for a description of some of these components. The delay line 306 comprises an optical pump 310 to compensate for optical losses. Such optical pumps are well known to those skilled in the arts.

Referring again to FIG. 2A, the bleed off electronically controlled coupling component 312 channels a portion of the light from the delay line 306 directly into a collimation lens 318, or optionally into a wavelength up-converter 316 and then to the lens 318, via optical line 314. A wavelength up-converter usually is a nonlinear crystal, well known to those skilled in the art, whereby the wavelength can be reduced.

The light leaving the collimation lens 318 is either reflected or transmitted through a spatial phase modulator 320, which can accurately adjust the phase by $X*\lambda(\Delta x,\Delta y)$, where $X \geq 0$, as compared to a reference. In one embodiment of the present invention the spatial phase modulator is a rotatable planar reflector which imparts different phase tilts to the illumination beam before interaction with the sample. In general, other forms of wavefront encoding are possible, not just phase-tilts. However, given the Fourier mathematical analogy that all waveforms may be synthetically and uniquely generated by an infinite series of tilted, and phase shifted, plane waves of various amplitudes, the proposed processes are quite general. In a broader sense, the process being described here is precisely this, as long as all the phase encoded elements are applied within the spatial and temporal coherence volume of the coherent illuminator. Phase encoded illumination can be used to extend the depth of focus imaging given that various waveforms can be synthesized with the above phase process, throughout the object volume. Imaged depth-of-field displaced phase objects are not invariant with different phase illuminations; hence, object depth information can be uniquely computed.

Figure 2B:
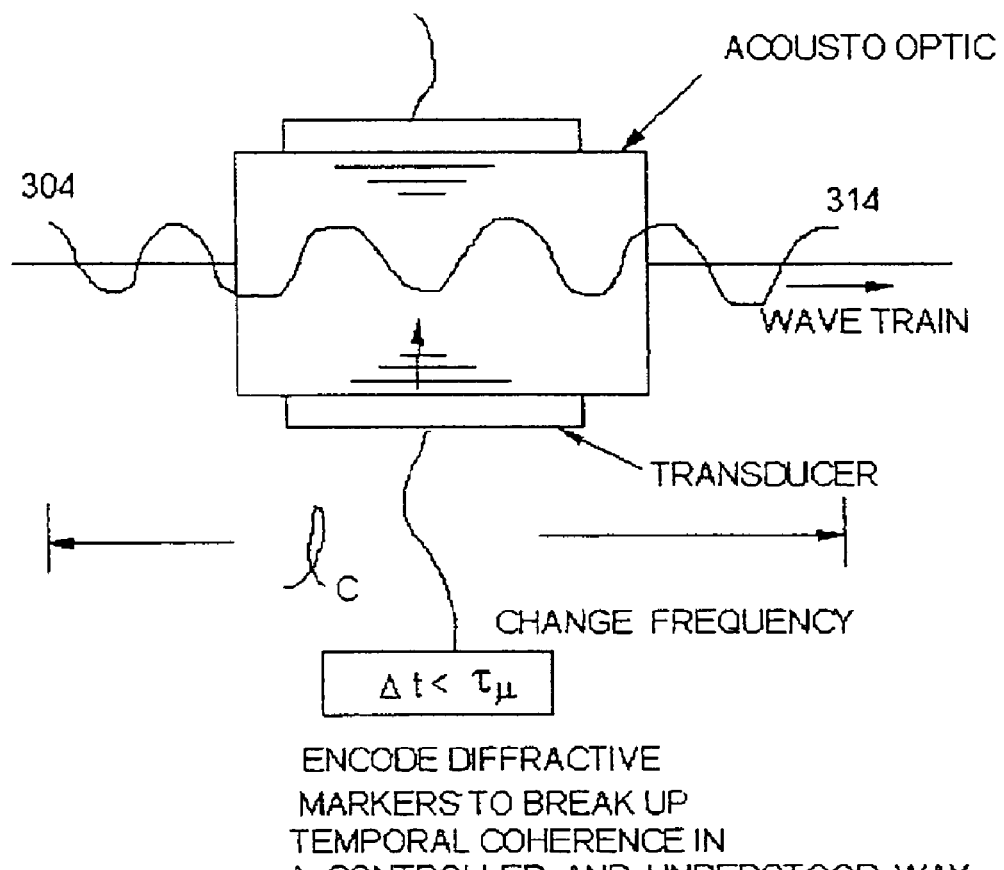
FIG. 2B is a schematic diagram an acousto-optic phase modulator in accordance with embodiments of the invention.

The spatial phase modulator 320 could alternatively be a device such as a mechanical (MEMS) device, an electro-optical (liquid crystal, acousto-optical, etc.) device, or combination device. FIG. 2B is a schematic illustration of an acousto-optic embodiment of a phase modulator. In the embodiment depicted in FIG. 2A the light leaving spatial phase modulator 320 is designated by numeral 15 as it is the same as phase modulated wavelet 15 in FIG. 1.

Referring again to FIG. 1, illumination optics 16 illuminate sample 18 with the phase modulated wavelet 15. The illumination optics 16 can be a grating, prism, lens, or some other pre-determined optical phase input device, such that the phase information encoded by spatial modulator 320 and delay line (components 308, 310, 306, and 312), is maintained. Phase modulated wavelet 15 interacts with sample 18 and is thereby transformed into perturbed wavelet 19. The perturbed wavelet is then directed by collection optics 20 through high speed shutter 22 to the spatial phase measurement system 24 which extracts the perturbed phase information from perturbed wavelet 19 to produce phase reconstructed wavelet 25. Reconstructed wavelet 25 is detected by high speed optical sensors 26 which produce a spatial phase mapping of the reconstructed wavelet 25. Image reconstruction program 28 then converts the spatial phase mapping from sensors 26 into an image of the sample 18. At this point the image formed from a single wavelet still contains high frequency specular noise (speckle). To reduce the speckle the plurality of images from all of the wavelets are added and averaged by statistical averaging program 30 to produce the final image 32. The high frequency speckle which is not optically resolvable tends to average to zero with continual statistical averaging, leaving only the optically resolvable lower frequency phase information, thereby producing a final averaged image with significantly reduced speckle.

Figure 3:
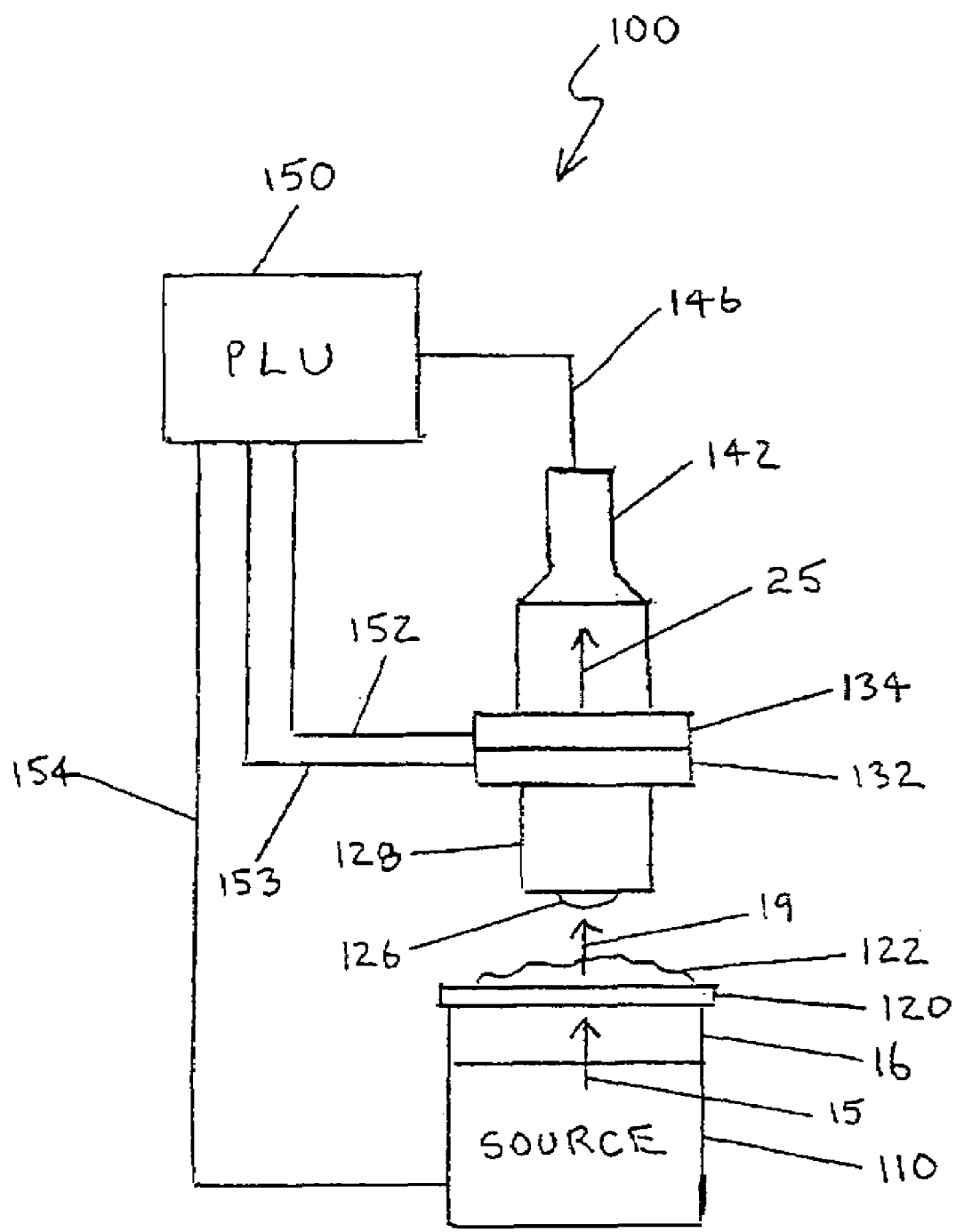
FIG. 3 is a schematic component diagram of a microscope in accordance with embodiments of the invention.

FIG. 3 is a schematic diagram of the components of a microscope 100 to carry out the method of the present invention described above. In FIG. 3 source 110 represents the components, illustrated as blocks 10-14 in FIG. 1, which produce phase modulated wavelets 15. Source 110 is connected to a programmable logic unit (PLU) 150 via communication line 154, although other communication systems and methods can be used.

In one embodiment, PLU 150 is, e.g., a programmable computer with multiple communication ports, display unit(s), data storage devices (e.g. RAM, ROM, or other memory storage devices), input device (e.g. a keyboard, a mouse, or other input devices), and the like.

As used in this specification, the term "communication line" refers to any number of systems and methods for enabling the conveyance of information between two or more components. Such systems and methods include, but are not limited to, fiber optical cable, conductive wire and the like, together with the necessary transducers at each component for sending and receiving the information.

Phase modulated wavelet 15 is directed to sample holder 120 via illumination optics 16 where it is scattered and/or diffracted by features of the sample to become perturbed wavelet 19. Perturbed wavelet passes through a lens 126 and objective 128. In the embodiment depicted, the objective 128 is connected to a high-speed shutter 132. The high-speed shutter 132 is connected to the PLU 150 via communication line 153. A controlled phase unit 134 is connected to the high-speed shutter 132. Controlled phase unit 134, which is connected to and controlled by PLU 150 via communication line 152, corresponds to spatial phase measurement system 24 in FIG. 1, whereby it extracts the phase information from perturbed wavelet 19 to produce reconstructed wavelet 25.

Controlled phase unit 134, controlled by PLU 150, may be used to effectuate the process described in U.S. Pat. No. 6,545,790; the entire disclosure of this United States patent is hereby incorporated by reference into this specification. This patent describes and claims: "A method for recovering information from a wave front corresponding to a substantially monochromatic coherent radiation, comprising: (a) irradiating a specimen of material with the substantially monochromatic coherent radiation, the specimen being positioned in a first plane; (b) filtering radiation modulated by the specimen according to N pre-determined filtering patterns corresponding to one or more filters, wherein said one or more filters are positioned substantially in the first plane; (c) for each of the N filtering patterns, capturing spatial intensity values for the filtered modulated radiation at a second plane to produce N corresponding intensity distributions, wherein the second plane is a conjugate diffraction plane with respect to the first plane; (d) processing the N intensity distributions captured in the second plane to provide an estimate of the wave front at the first plane, the step of processing comprising correcting the effect of the corresponding filtering patterns; (e) filtering the provided wave front estimate using the N different filtering patterns to obtain N filtered estimates; (f) processing the filtered estimates to produce N estimated intensity distributions at the second plane; and (g) repeating steps (d), (e) and (f) until an error measure associated with the captured and the estimated intensity distributions in the second plane reaches a predetermined threshold."

The controlled phase unit 134, controlled by PLU 150, may alternatively be used to effectuate the process of U.S. Pat. No. 6,369,932, the entire disclosure of which is hereby incorporated by reference into this specification. This patent describes and claims: "1. A method for recovering phase information of a wave front of a substantially monochromatic coherent waveform comprising: (a) providing a lens having an associated back focal plane (BFP) and image plane (IP); (b) passing the wave front through the lens and through a phase filter disposed at the BFP of the lens, the phase filter imparting known phase shifts to the wave front; (c) recording spatial intensity values for the wave front at the IP; d) repeating steps (b) and (c) N−1 times for different values of the imparted phase shifts to obtain N intensity images of the wave front at the IP; (e) associating phase values for each of the N intensity images of the wave front to form N synthetic wave front images; (f) processing the N synthetic wave front images to obtain a single estimate of the wave front at the BFP; (g) generating modified N synthetic wave front images based on the recorded spatial intensity values for each image, on the estimate of the wave front at the BFP and on the corresponding phase shifts; and (h) repeating the process in steps (f) and (g) until an error measure associated with the N synthetic wave front images reaches a predetermined value."

One may use any of the spatial modulators known to those skilled in the art for the controlled phase unit 134. Reference may be had, e.g., to U.S. Pat. Nos. 6,624,756, 6,567,163, 6,563,167, 6,552,777, 6,538,800, 6,538,791, 6,430,328, and the like. The entire disclosure of each of these United States patents is hereby incorporated by reference into this specification. The phase measurement processes disclosed in the Gershberg U.S. Pat. Nos. 6,365,932 and 6,545,790 are just two examples of implementing the spatial phase measurement block 24 in FIG. 1. Other processes, e.g. Mickelson interferometry, will be apparent to those skilled in the art.

Referring again to FIG. 3, digital camera 142 is connected to controlled phase unit 134. Digital camera 142, which is connected to PLU 150 via communication line 146, captures reconstructed wavelet 25 and produces a phase mapping of reconstructed wavelet 25. PLU 150 is additionally programmed with an image reconstruction program that converts the wavelet 25 phase mapping, captured by digital camera 142, into an image of sample 122. PLU 150 is additionally programmed to form such images of sample 122 for the plurality of wavelets created by source 110 within the coherence length of laser 302. PLU 150 is additionally programmed to add and statistically average the plurality of images from all of the wavelets to produce a final image of sample 122. The high frequency speckle in the individual wavelet images, which is not optically resolvable, tends to average to zero with continual statistical averaging, leaving only the optically resolvable lower frequency phase information, thereby producing a final averaged image with significantly reduced speckle. The final image is, e.g. a 2 dimensional image, a 3 dimensional image, a hologram, and/or the like.

Additionally, PLU 150 comprises devices for storing both the raw data received from the digital cameras 142 and 144 as well as devices for storing the reconstructed images. In one embodiment, PLU 150 comprises devices for transmitting the data and images to other storage devices and media, computers, computer and/or communication networks, and the like.

Digital camera 142 is, e.g. Andor's iXon87 Electron Multiplying CCD camera, or other high-speed digital camera. In one embodiment, the digital camera 142 has sufficient resolution that sampling is ≦25% of the center lobe of the Point Spread Function (PFS) of the optical system. The camera speed needs to be $\geq \tau_c$ (coherence tie) defined within the source-sample interaction region. The camera sensitivity, for a given sensor quantum efficiency and optical field amplitude, is >S/N (signal-to-noise ratio) of the entire imaging chain. The imaging chain includes: light capture→statistical optical noise→Sensor→statistical sensor noise→Digital conversion→statistical electronic noise→Algorithmic processing.

Figure 4A:
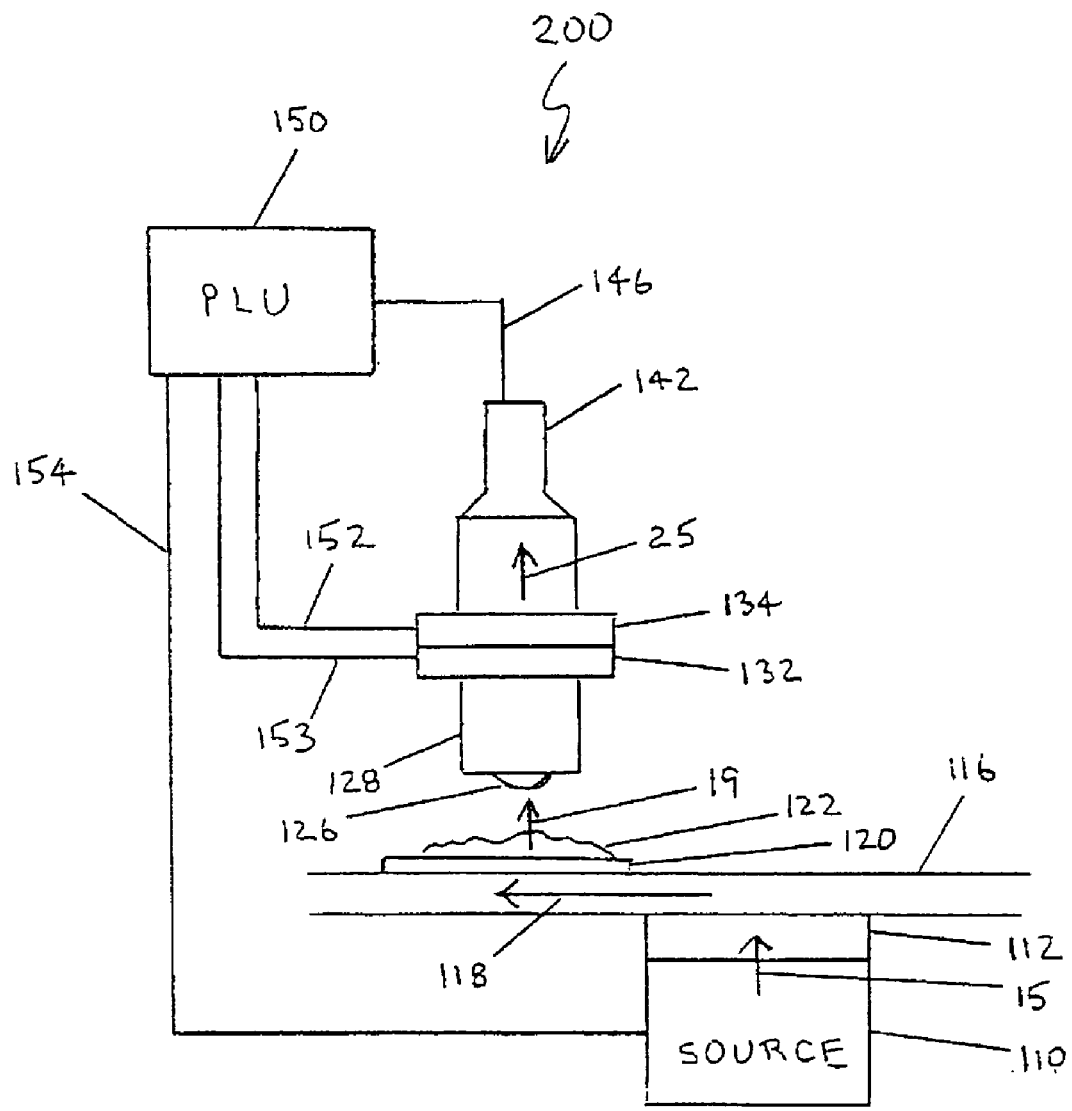
FIG. 4A is a schematic component diagram of a microscope with indirect illumination of the sample in accordance with embodiments of the invention.

FIG. 4A is a schematic diagram of the components of a microscope 200 that is an alternate embodiment of microscope 100 in FIG. 3. Referring to FIG. 4A, the wavelet 15 from source 110 passes through a grating coupler 112 used to couple in the coherent wavelet 15 into an optical waveguide 116. As will be apparent, the function of the grating coupler 112 is to transport light into the sample 122. Other coupling devices, such as a prism (not shown), also may be used.

Figure 4B:
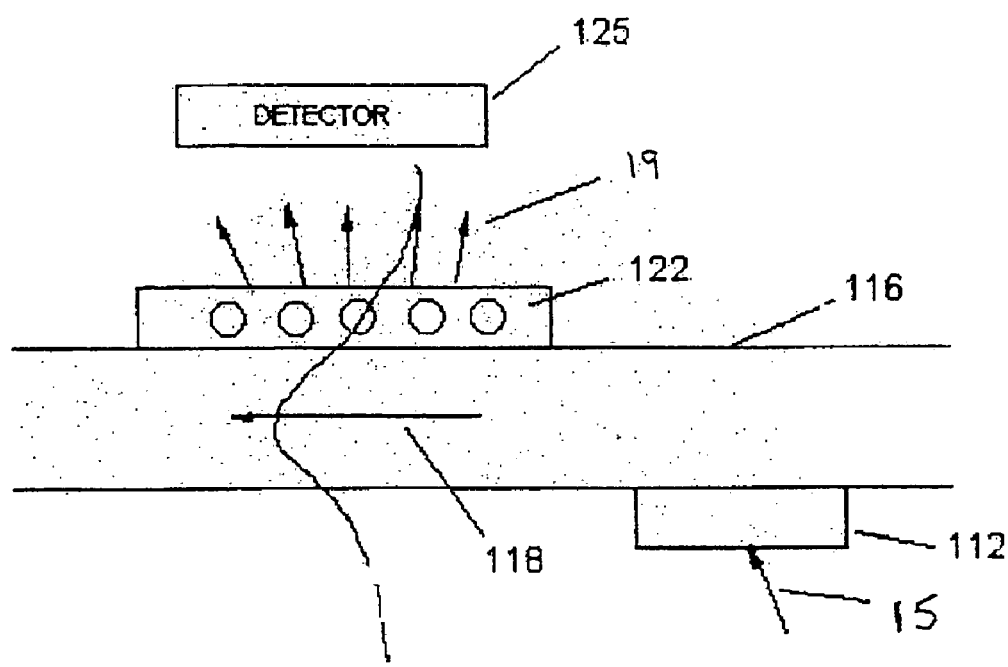
FIG. 4B is a schematic diagram further illustrating the indirect sample illumination.

In the embodiment depicted in FIG. 4A, the wavelet 15 contacts diffraction grating 112 that couples the light so that some of it passes through the waveguide 116, and some of it passes down the length of the waveguide as a "waveguide mode." A schematic depiction of this function is illustrated in FIG. 4B. As will apparent from FIG. 4B, depending upon the sample and its properties, one can choose waveguide illumination devices that will be sufficient to illuminate the sample but will minimize light pollution.

As will be apparent from the Figures in and attached to this specification, and the discussion thereof, the waveguide illumination devices are chosen such that the phase information of the illuminating light is not changed in an undetermined way, thus producing data that cannot be analyzed. To that end the signal to noise ratio of the light detected by detector 125 (see FIG. 4B) is greater than about 1 and, in one embodiment, greater than about 2.

Referring again to FIG. 4A, the grating coupler 112 is a conventional grating coupler that is commercially available. Thus, by way of illustration and not limitation, one may use one or more of the grating couplers described in U.S. Pat. Nos. 5,218,584, 5,153,860, 5,070,488, 4,868,803, 5,363,226, 5,481,516, and the like. The entire disclosure of each of these United States patents is hereby incorporated by reference into this specification.

One embodiment of another grating coupler 712 is illustrated in FIG. 4C. Referring to FIG. 4C, it will be seen that coherent light rays 714, 716, 718, and 720 impact diffraction gratings G3, G2, G4, and G1, respectively. Some of the light diffracted by these gratings passes through waveguide 722. The light waves coherently interact in the sample region 724 to form a controllable interference pattern; in this pattern, two dimensions in space, and time, are controlled. As will be apparent, other devices or systems producing the desired output may be used. Thus, e.g., one may use a waveguide 116 with one or more coupling regions.

Referring again to FIGS. 4A and 4B, the waveguide 116 is a planar waveguide that has good transmission characteristics for the illumination wavelength of interest. One may use, e.g., one or more of the planar waveguides described in the prior art such as, e.g., those planar waveguides described in the claims of U.S. Pat. Nos. 6,432,292, 6,215,928, 6,160,824, 5,485,277, 6,546,163, 5,365,243, and 4,961,618. The entire disclosure of each of these United States patents is hereby incorporated by reference into this specification.

In one embodiment, the waveguide 116 is made from an amorphous material (such as, e.g., glass) and/or crystalline material.

Referring again to FIGS. 4A and 4B, the coupled-incoherent light 118 travels through the waveguide 116 to the sample holder 120 where it is scattered and/or diffracted by features of the sample to become perturbed wavelet 19.

The use a waveguide to direct the illuminating radiation onto the sample as in FIGS. 4A and 4B instead of directly as in FIG. 3 is a form of highly structured dark-field illumination or a kind of near-field-imaging. Evanescent waves, which are spatially connected to interfering modes within the waveguide cavity, extend beyond the waveguides surface and into a object sample that lays upon it. The object of interest will interact with these evanescent fields and side scatter the light energy into the microscope. In this way, interfering waves with features in a dense waveguide that are $<<\lambda/2$ can resolve more object details that using a more direct illumination approach.

Figure 5:
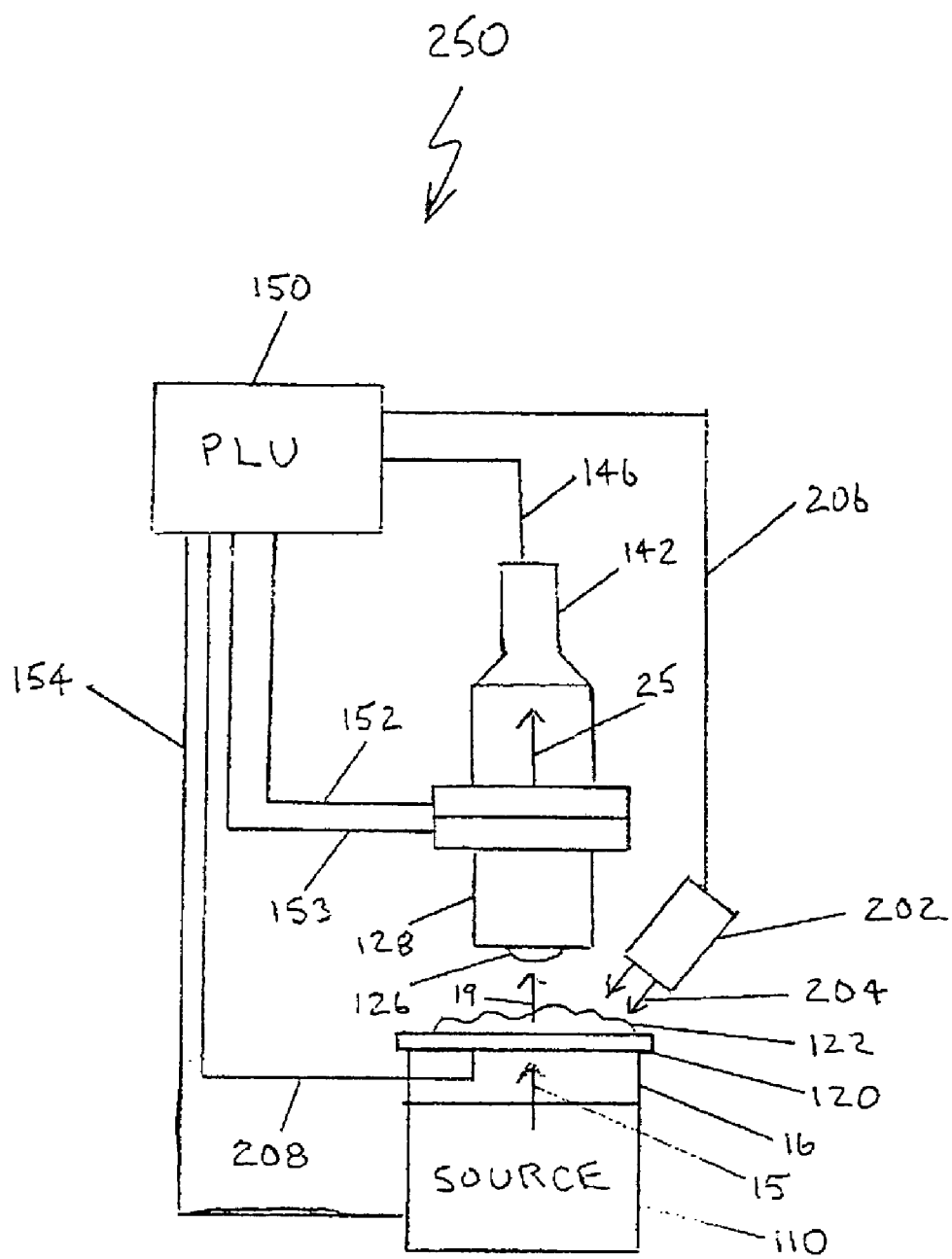
FIG. 5 is a schematic component diagram of a microscope with a sample stimulator in accordance with embodiments of the invention.

FIG. 5 is a component schematic of another embodiment of an optical microscope 250. In addition to the components described in the embodiment depicted in FIG. 3, and the accompanying descriptive text, optical microscope 250 comprises a sample-stimulating unit 202. Sample stimulating unit 202 emits stimulating signals 204 that strike the sample 122 in part or in whole. Simulating signals 204 are, e.g. laser and/or other light waves, sound waves, electric fields, magnetic fields, a liquid stimulant, a gaseous stimulant, ion beams, electron beams and/or other sample stimulating devices. In another embodiment (not shown) sample stimulating devices may be included as part of sample holder 120 and may include one or more nano-probes, e.g. nano-tubes and the like which are used for simulation of the sample through mechanical contact with the sample 122. In another embodiment sample stimulation unit 202 further comprises sensing devices or systems for sensing physiological and/or other properties of the sample, e.g. temperature, surface membrane tension, gases given off by the sample 122, electromagnetic (including light) signals given off by the sample 122, the sample's shape, and the like. Observations of what happens in a living system can be made given a certain stimulus. Given the observed system is alive, adding a little controlled stimulus is an effect for of experimentation.

Referring again to FIG. 5, it will be seen that sample stimulation unit 202 is optionally connected to PLU 150 via communication line 206. In one embodiment, sample stimulation unit 202 is controlled by programmable algorithms in the PLU 150. In another embodiment sample stimulation unit 202 is controlled by programmable algorithms in the PLU 150, which are in part or in whole based on a timed sequence. In another embodiment, PLU 150 receives sensed data from the sample stimulation unit 202. In yet another embodiment, PLU 150 adjusts the stimulation of the sample 122 based on algorithms that sample the sensed data. In another embodiment, PLU 150 adjusts the stimulation of the sample 122 based on algorithms which sample the sensed data and which samples or otherwise interrogates a database. In yet another embodiment, the PLU 150 enables an operator (not shown) of the microscope 200 to adjust the sample stimulation unit's 202 parameters and functionality in real time.

In another embodiment, not shown in a figure, a sealed enclosure that encloses sample 122 in FIGS. 3, 4A, or 5 is provided. In another embodiment, other components, in part or in whole, of the microscope are enclosed. In one embodiment the enclosure encloses all paths of the light through the microscope that would otherwise be open to normal atmospheric air. In another embodiment, the enclosure is used to hold a gas. In another embodiment, the enclosure is connected to vacuum pumps and is used to maintain a partial vacuum.

Figure 6:
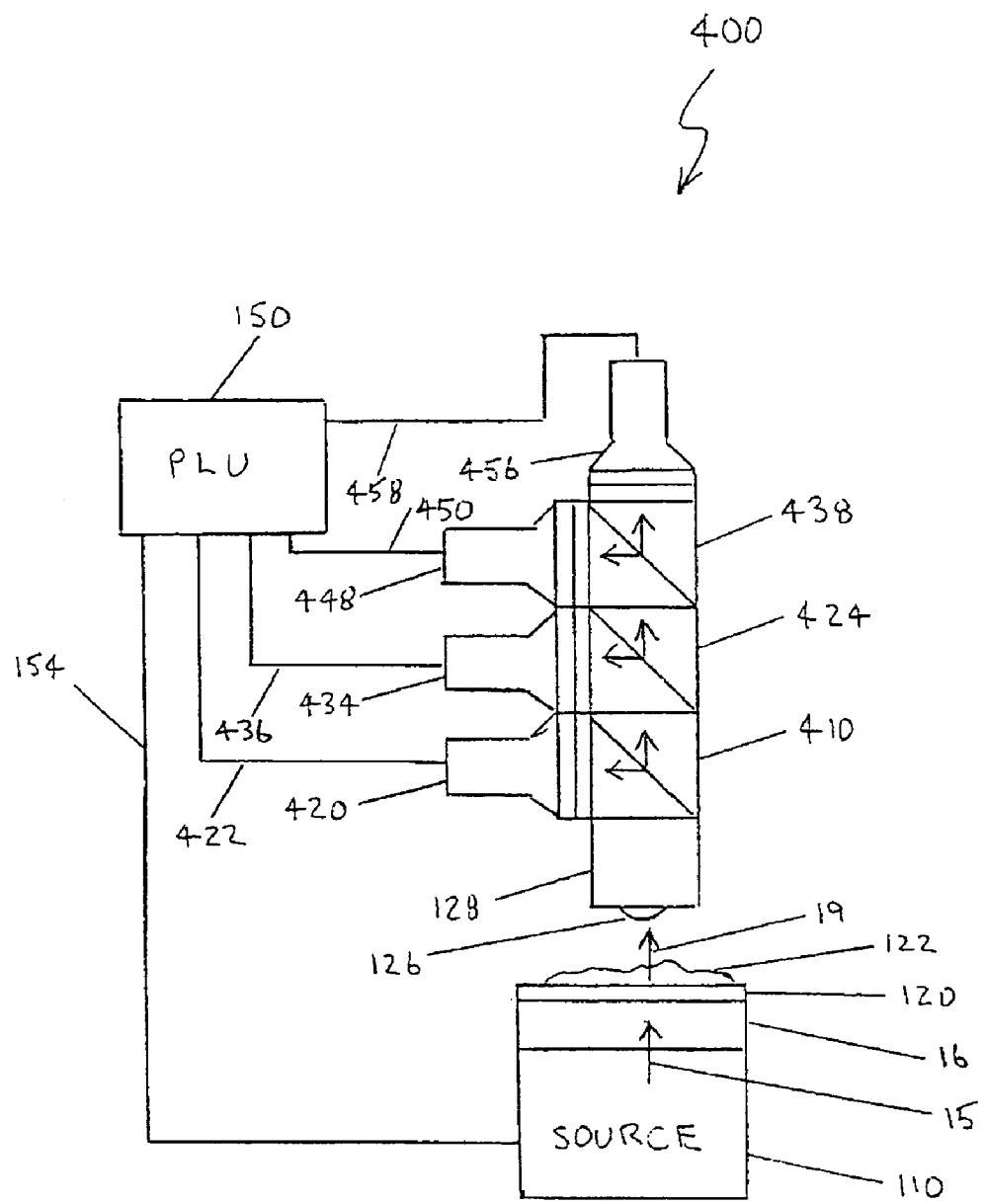
FIG. 6 is a schematic component diagram of a microscope with multiple digital cameras in accordance with embodiments of the invention.

FIG. 6 is a component illustration of an optical microscope 400 with multiple digital cameras 420, 434, 448, 456, connected respectively to PLU 150 via communication lines 422, 436, 450, 458. Wavelet 19 is split and directed into each camera by beam splitters 410, 424, 438. The use of multiple digital cameras permits faster parallel processing of the perturbed wavelet phase information. This arrangement can also be used to algorithmically extract the imaged optical phase information of the sample via phase diversity, phase encoding, or other phase processes that are post-sample-light-interactive.

Figure 7:
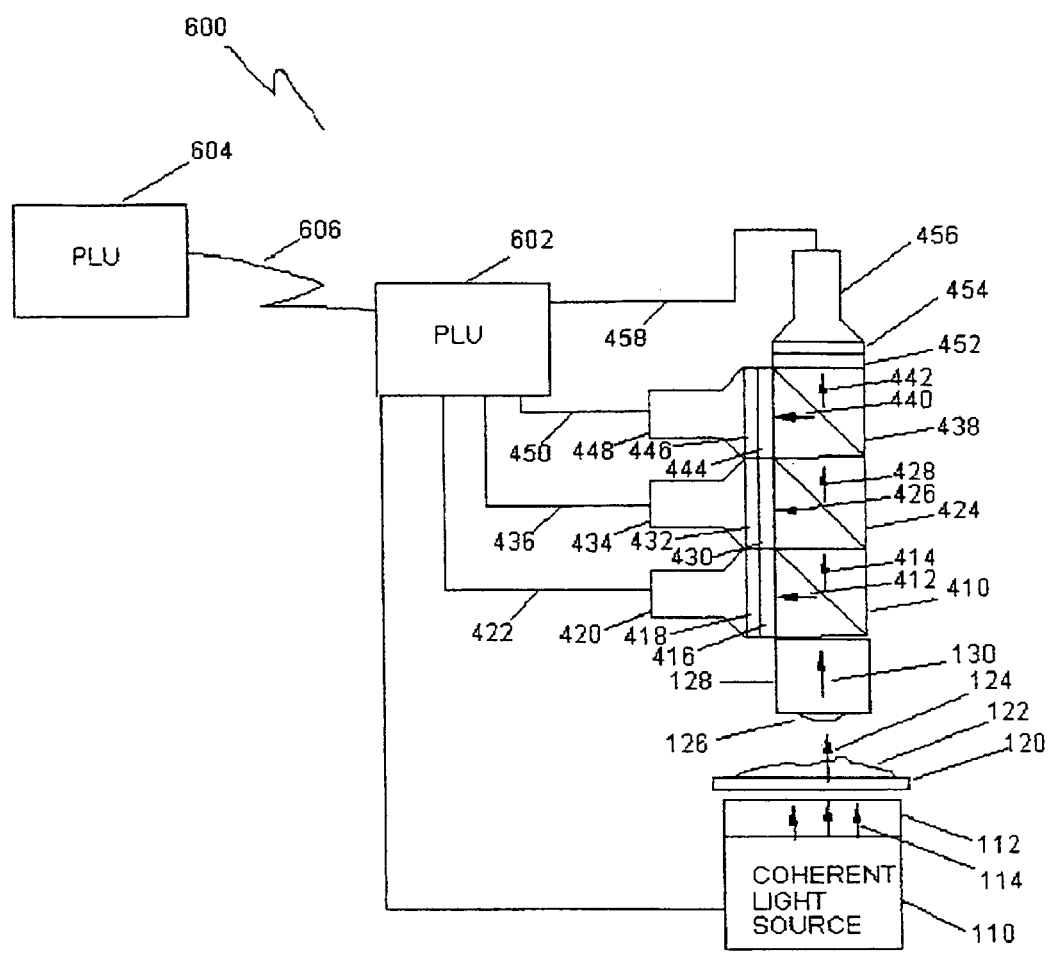
FIG. 7 is a schematic component diagram of a microscope connected to a communications network in accordance with embodiments of the invention.

FIG. 7 is a component illustration of an optical microscope 600 with a bi-directional network communication system 606 to a remote computer system 604. In one embodiment, the PLU 602 transmits the raw image data to the remote computer system 604 that runs image construction software (not shown but see the Gerchberg and other image construction patents referenced above) to construct final images (not shown). Remote computer system 604 transmits the final images (not shown) to the local PLU system 602 to be displayed to the local microscope operator (not shown). In one embodiment, remote computer system 604 stores both the raw image data collected and the constructed images in data storage media (not shown). In another embodiment, the remote computer system 604 comprises additional modeling software (not shown) that receives the constructed images (not shown) and produces a 3D Computer Aided Design or other computer model (not shown) of the imaged sample. The remote computer system 604 transmits the 3D computer model (not shown) to the local microscope PLU system 602 which has additional software (not shown) to display the received 3D computer model (not shown) to the local microscope operator (not shown).

In another embodiment, not shown, a microscope like that of FIG. 3, 4A, 5, 6, or 7 has a robotic sample loader (not shown). In this embodiment, there is no local microscope operator. In one embodiment the sample loader (not shown) is controlled by a program (not shown) in the PLU 602. In another embodiment the sample loader (not shown) is controlled remotely by a computer program interface (not shown) on the remote computer system 604 and a remote operator (not shown) that issues commands through the computer program interface.

A Preferred Means for Modifying the Coherent Volume of Light.

Figure 8:
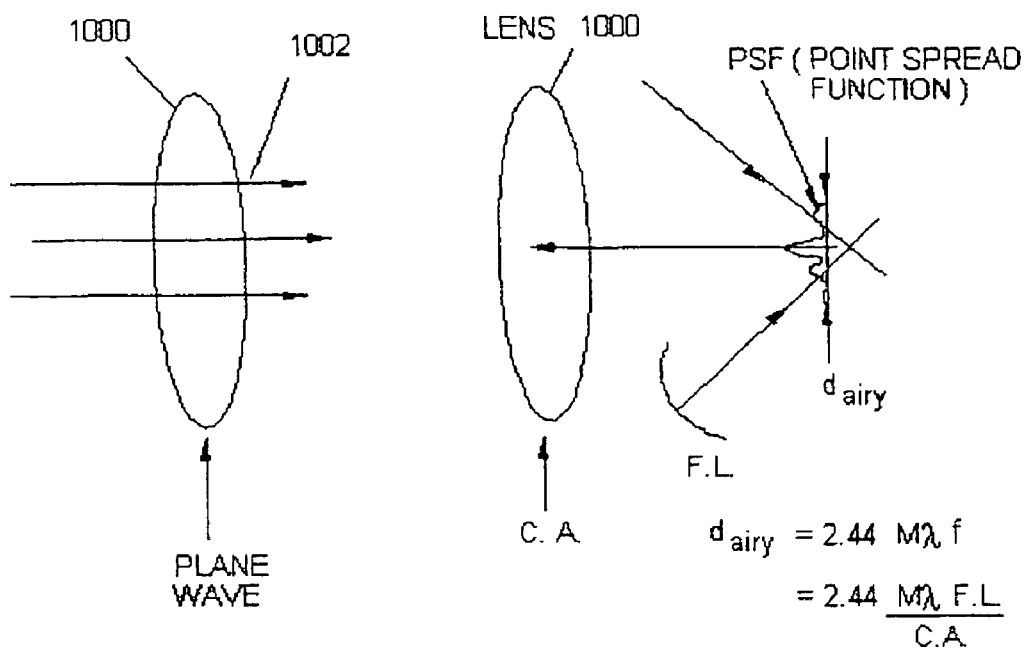
FIG. 8 is a block diagram of a lens in a detection system for use in an optical microscope in accordance with embodiments of the present invention.

FIG. 8 et seq. schematically illustrates one of the problems that is capable of being solved by applicant's process and apparatus.

An Airy disc is the central peak (including everything interior to the first zero or dark ring) of the focal diffraction pattern of a uniformly irradiated, aberration-free circular optical element or system. Reference may be had, e.g., to U.S. Pat. Nos. 6,385,157, 5,612,818, 5,457,533, 5,392,271, 4,975,237, and the like. The entire disclosure of these United States patents is hereby incorporated by reference into this specification. FIG. 8 illustrates a lens 1000 through which plane waves 1002 are transmitted. It is preferred that the lens 1000 be diffraction limited, thereby producing an Airy disc. This idealized situation is illustrated in FIG. 8. In general, the point spread function of the imaging system is equal to or larger than the diameter of the Airy disc. The diameter of the Airy disc is given in FIG. 8, by reference the equation presented therein.

In the remainder of the discussion in this section of the specification, reference will be made to the idealized Airy disc situation. It is to be understood, however, that any comments made with regard to such Airy disc are equally pertinent to the point spread function.

Figure 9:
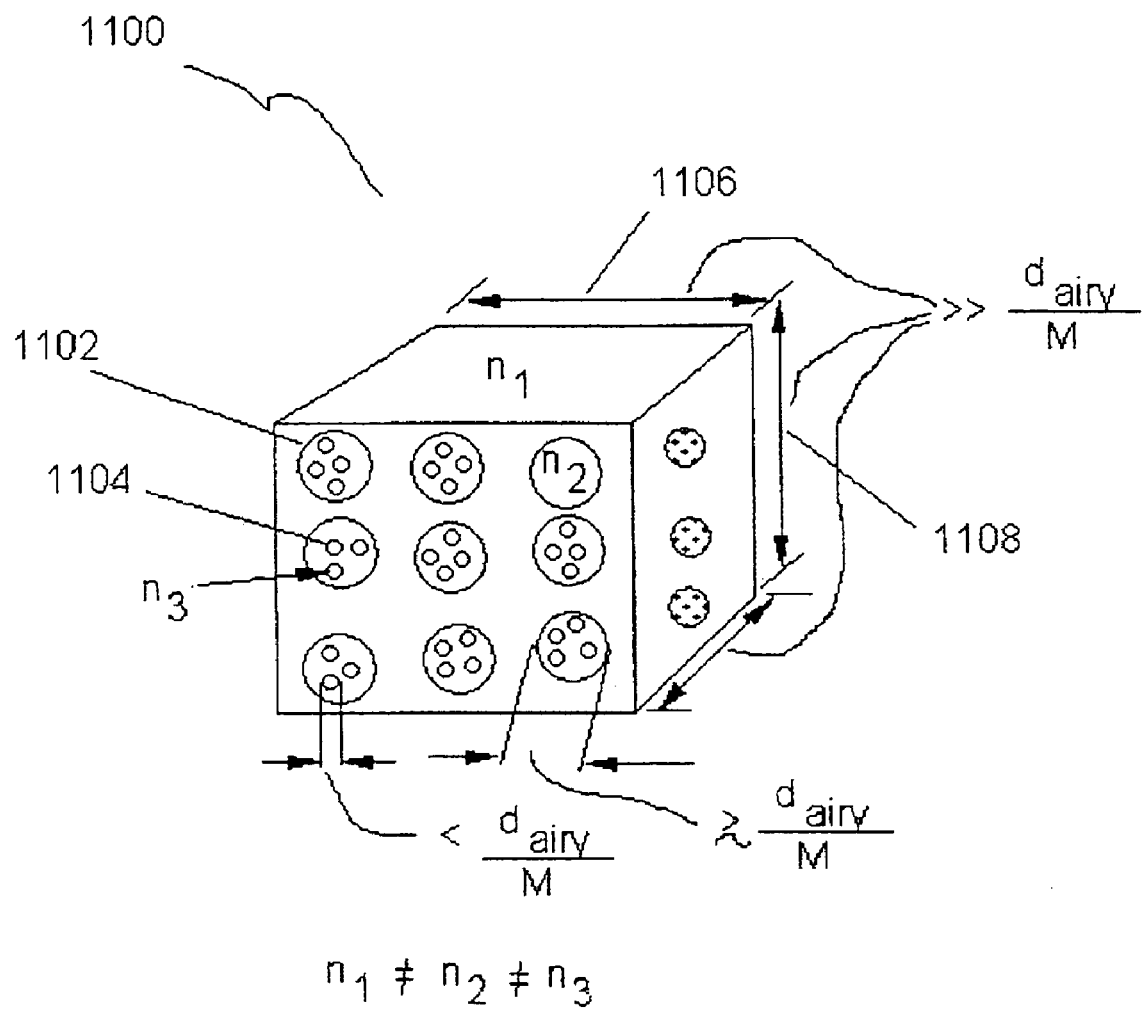
FIG. 9 is a perspective diagram of a sample with resolvable subcellular units and non-resolvable subcellular units.

FIG. 9 is a schematic illustration of a cell 1100 that is comprised of resolvable subcellular units 1102 and non-resolvable subcellular features 1104.

The diameter of the Airy disc, "dairy," divided by M (the optical magnification of the imaging system), yields a volume reference factor. Each of dimensions 1106 and 1108 is substantially larger than this volume reference factor of at least 2 and, preferably, at least 3.

The diameter of the subcellular units 1102 generally is at least twice as big as the volume reference factor. In one embodiment, the refractive index of the units 1102 differs from the refractive index of the units 1104, and the refractive index of the entire cell also preferably differs from the refractive indices units 1102 and 1104.

Figure 10:
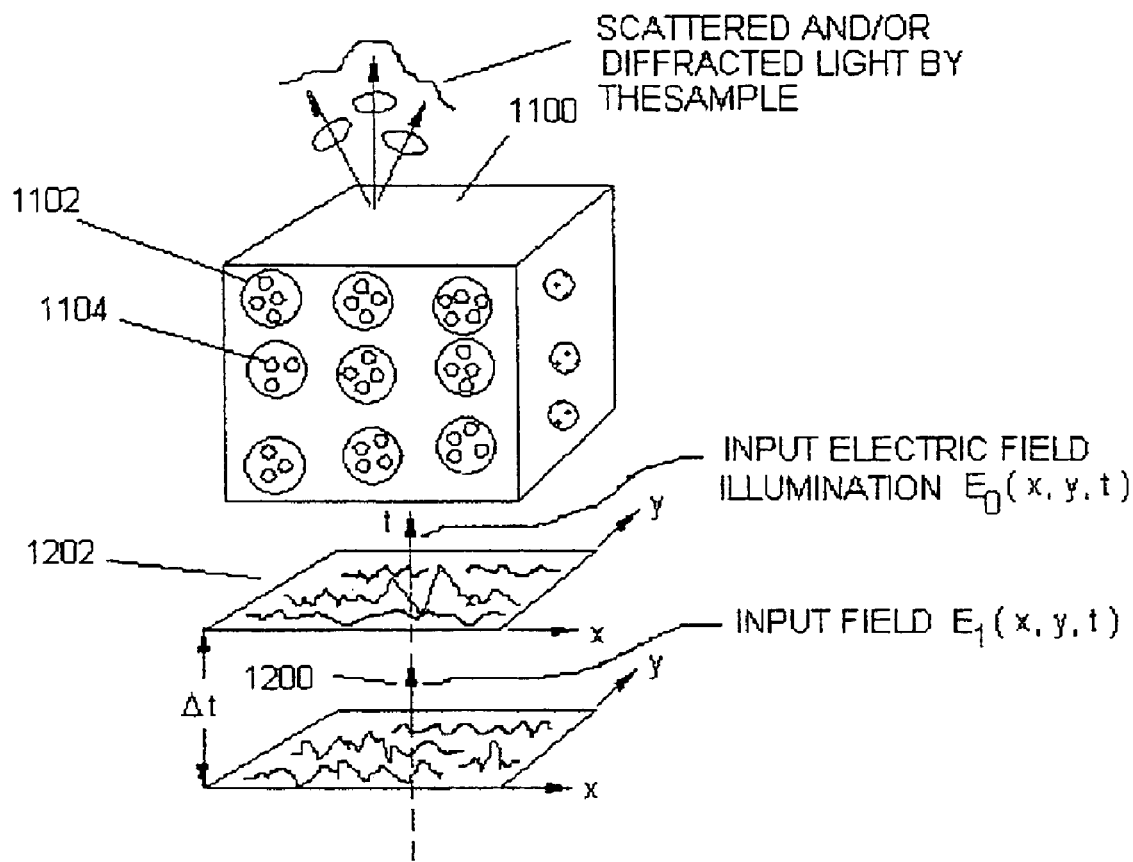
FIG. 10 is a perspective diagram of an interaction of an electrical field with a sample.

FIG. 10 is a schematic illustration of the interaction of an input electrical field with the phase volume. The input electric field 1200 interacts over a period of time (see delta t) with an object 1202. The "delta t" must be large enough for the imaging system to acquire the optical phase of the scattered and/or diffracted light from a detector for each of the functions $E_n$ (x,y, $t_n$). The other requirements for the preferred system are discussed in FIG. 10. These requirements define how it is preferred to spatially and temporally modulate the input electric field $E_n$.

Figure 11:
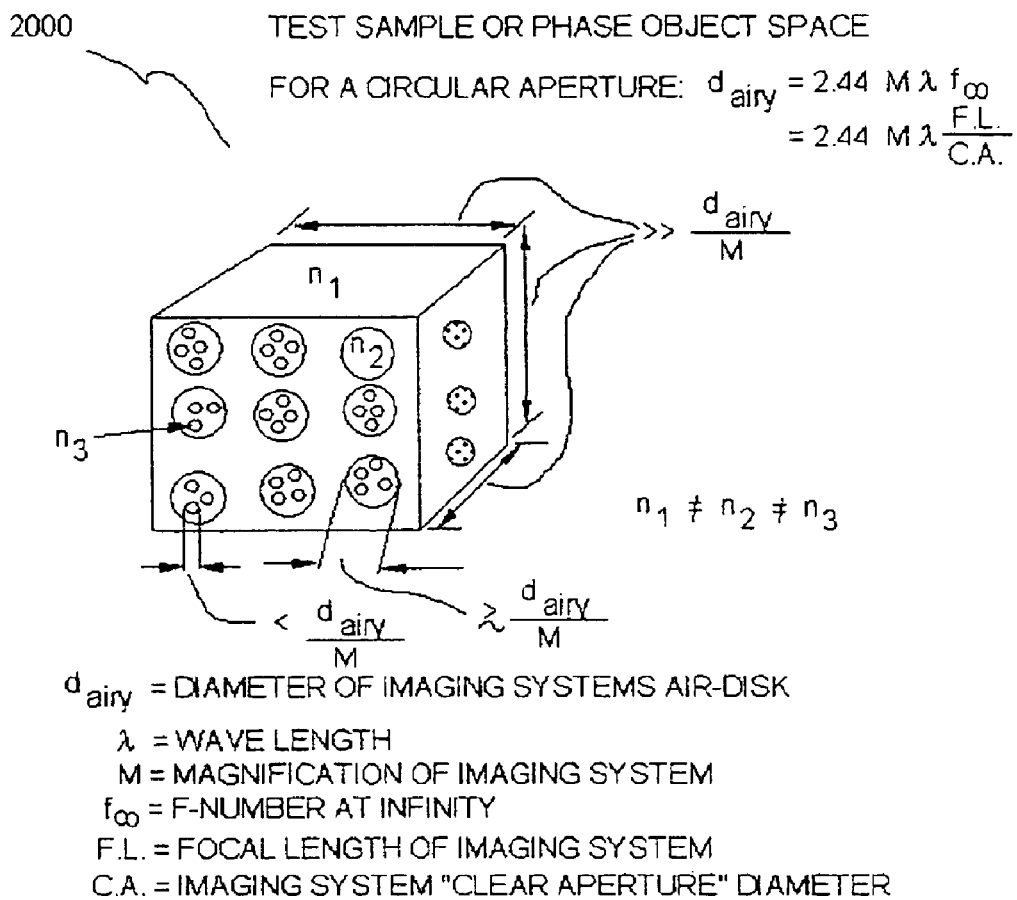
FIG. 11 is a perspective diagram of a test sample for testing embodiments of the present invention.

FIG. 11 is a schematic illustration a test assembly that allows one of ordinary skill in the art to determine whether he has practiced applicant's process correctly. Referring to FIG. 11, applicant's process produces an image that meets the criteria specified in such Figure.

Figure 12:
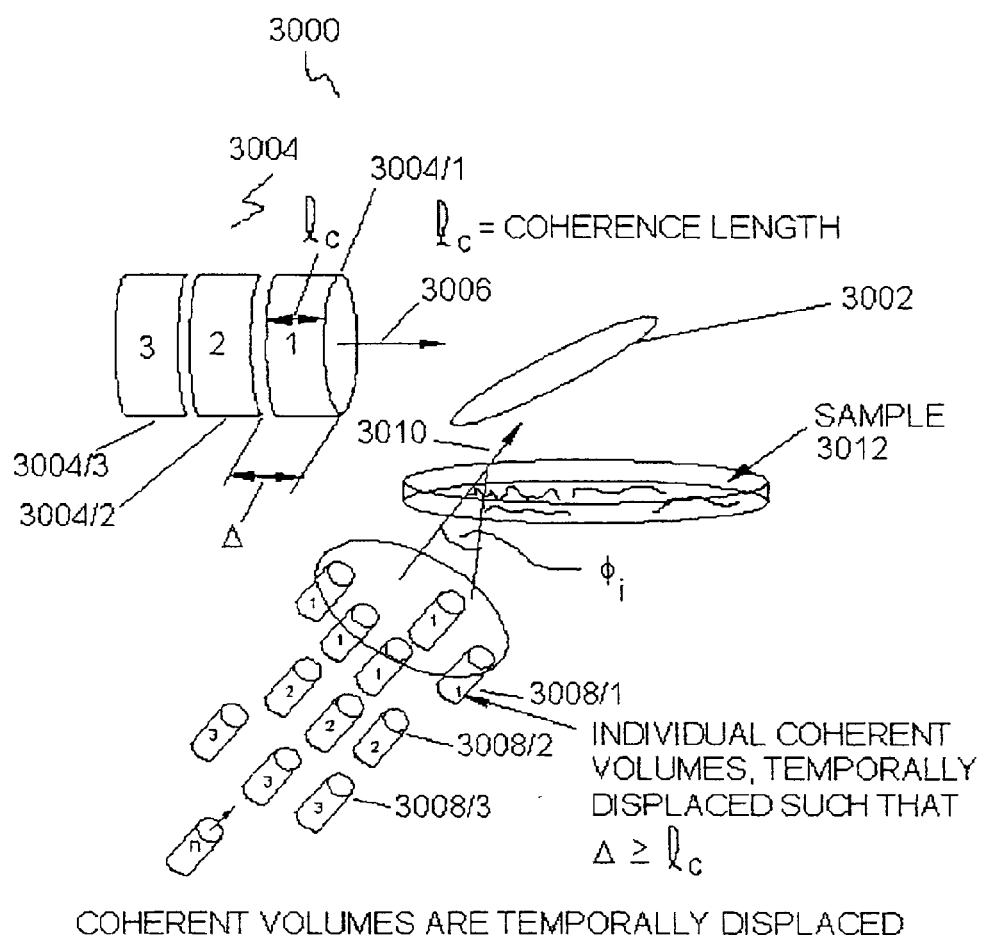
FIG. 12 is a perspective diagram of coherent light from a coherent light source passing through a sample with a reference beam traveling in a first direction.

FIG. 12 is a schematic of a process 3000 that utilizes a beam splitter 3002. A coherent beam of light 3004 (a reference bundle of light) is comprised of coherent volumes 3004/1, 3004/2, 3004/3, etc. The light beam 3004 is preferably traveling in the direction of arrow 3006.

Simultaneously, coherent beam of light 3008 travels in the direction of arrow 3010 through the sample 3012. The coherent volumes 3008/1 interact with coherent volumes 3004/1, the coherent volumes 3008/2 interact with the volumes 3004/2, and the coherent volumes 3008/3 interact with the coherent volumes 3004/3.; these interactions are interferometric, and they furnish information about the phase of the light that has interacted with the sample.

Figure 13:
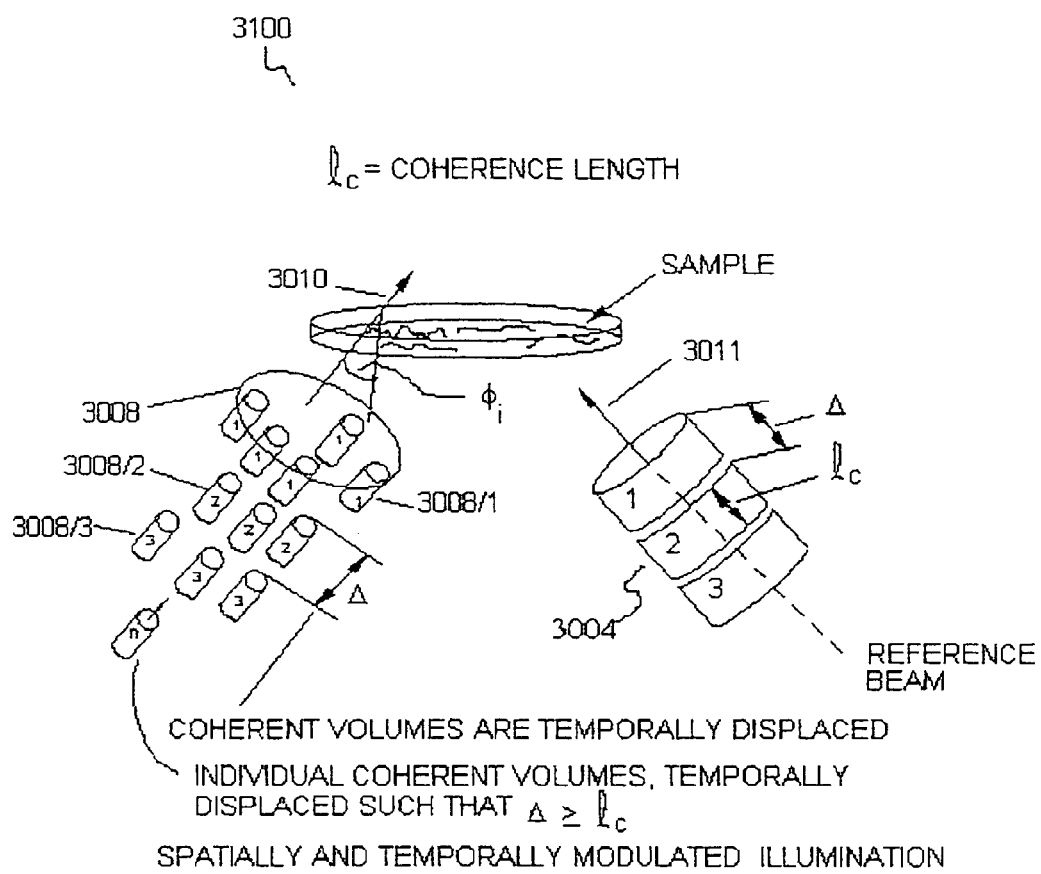
FIG. 13 is a perspective diagram of coherent light from a coherent light source passing through a sample with a reference beam traveling in a second direction.

FIG. 13 illustrates a "shearing-interferometric" process 3100 that is similar to the process depicted in FIG. 12 but in which the reference bundle of light 3004 is passed in the direction of arrow 3011 (see FIG. 13) rather than in the direction of arrow 3006 (see FIG. 12). As will be apparent, either or both of the processes of FIGS. 12 and/or 13 may be used with any the devices depicted in FIGS. 1-7.

Figure 14:
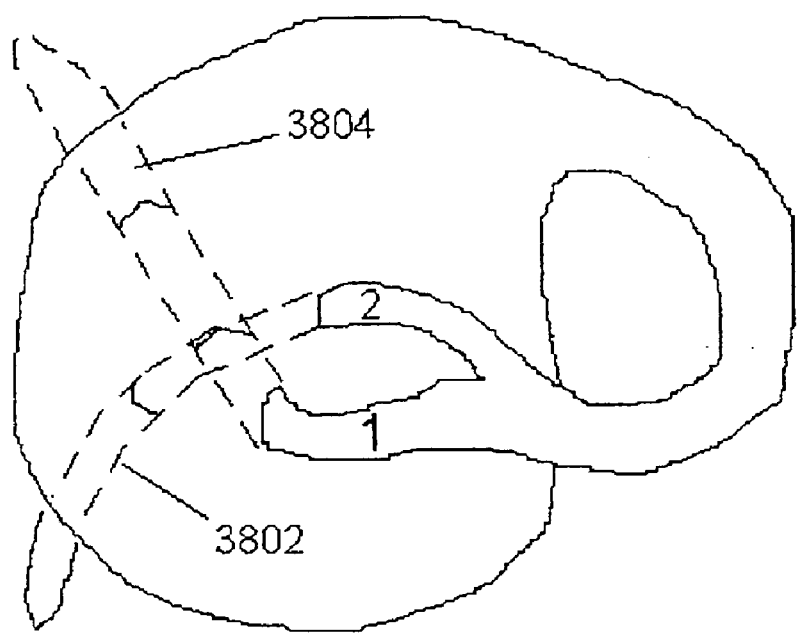
FIG. 14 is a diagram of a scan of a three-dimensional sample using multiple coherent threads with a reference zone in the sample.

FIG. 14 is a schematic of a process 3800 for scanning a three-dimensional sample not shown in three axes using multiple coherent threads 3802 and 3804.

FIG. 14A is a schematic illustration of a process 4000 for scanning a three-dimensional sample 4002 in three axes, axis 4004, axis 4006, and axis 4008. Different measurements are made at different points of time in different axis.

In the embodiment depicted, the coherent thread 4010 is caused to move in the x, y, and z axes within a reference zone 4012; the interferometric information thus produced exists in perturbed interaction zone 4014. As will be apparent, the coherent thread 4010 is part of a larger coherent volume 4016 that, in the embodiment depicted, has an irregular three-dimensional shape. As will also be apparent, more than one such coherent thread may be used.

In one embodiment, the means for delivering the light bundles 3004 (the reference bundle) is an optical fiber with a distal end whose core diameter is less than about 1 micron and, more preferably, less than about 0.5 micro. In this embodiment, such distal end may be used to scan cell volume either outside of cell walls or inside the cell walls. The distal end of such fiber preferably is comprised of means to penetrate the cell membrane. The optical fiber preferably is made from biocompatible glass.

Figure 15:
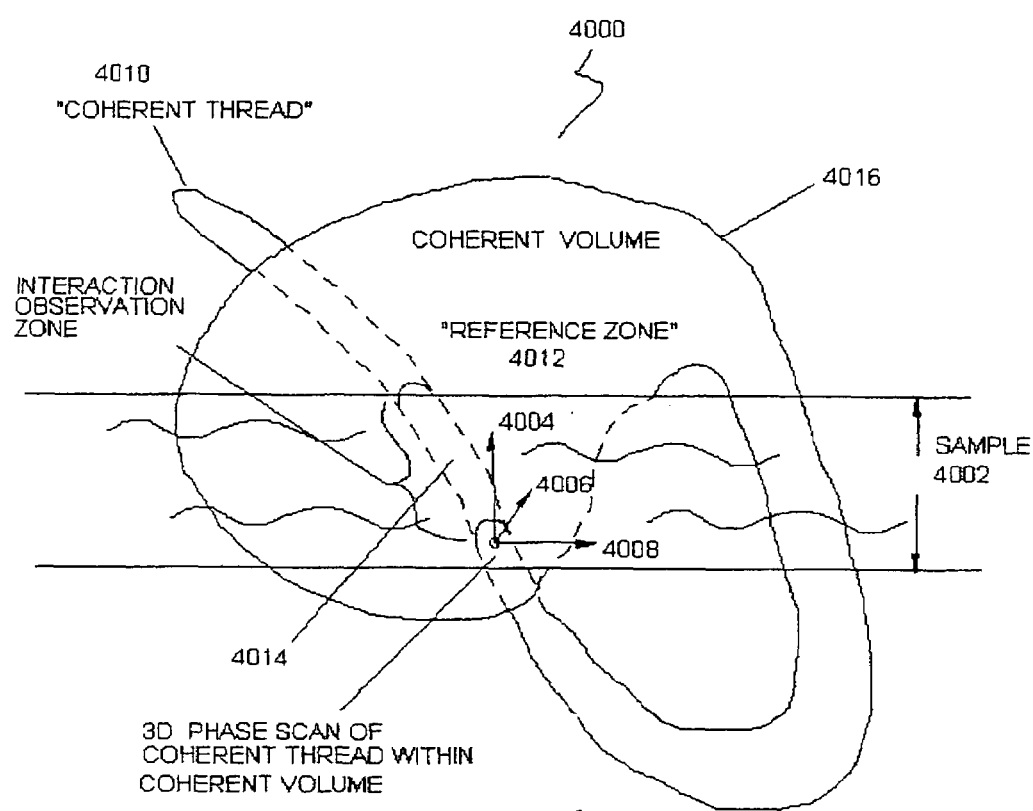
FIG. 15 is a diagram of a scan of a three-dimensional sample in three axes.
Figure 16:
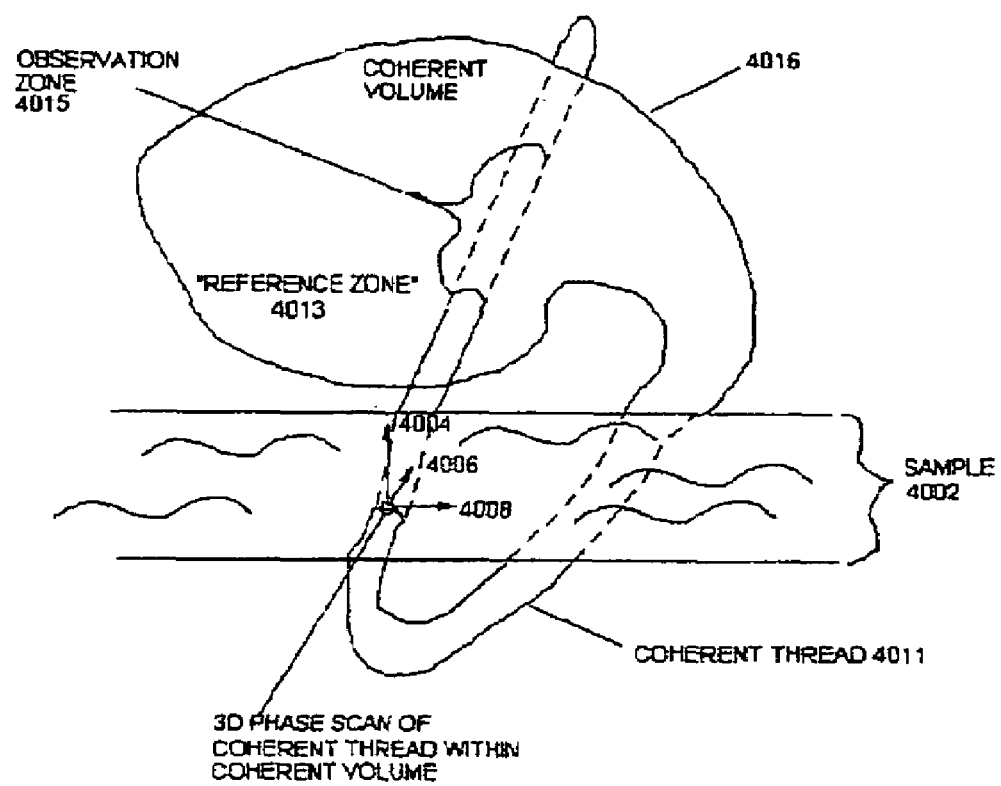
FIG. 16 is a diagram of a scan of a three-dimensional sample using multiple coherent threads with a reference zone outside the sample.

FIG. 15 depicts a process similar to that depicted in FIG. 14 with the exception that the reference zone 4012 is outside of the sample 4002, the reference zone 4013 differs from the reference zone 4012, and the coherent thread 4011 differs from the coherent thread 4010. The resultant observation zone 4015 differs from observation zone 4014.

What is claimed is:

1. A method of imaging a sample, the method comprising:
    (a) temporarily dividing a coherent wave into a plurality of coherent wavelets;
    (b) spatially modulating the phase of each coherent wavelet a known different amount, thereby producing a plurality of modulated wavelets;
    (c) interacting each modulated wavelet with the sample, thereby producing a plurality of perturbed wavelets;
    (d) creating a spatial phase map of each perturbed wavelet;
    (e) constructing a sample image from each perturbed wavelet spatial phase map; and
    (f) statistically averaging all of the sample images to produce a final averaged image of the sample.

2. The method as set forth in claim 1 wherein the plurality of coherent wavelets is created from within one coherence length or less of the coherent wave.

3. The method as set forth in claim 2 wherein the coherent wave is electromagnetic radiation from a laser.

4. The method as set forth in claim 3 wherein the coherent wave is temporally divided into a plurality of coherent wavelets by feeding the coherent wave into a fiber-optic delay and bleeding off each coherent wavelet with an electronically controlled coupling component.

5. The method as set forth in claim 4 wherein the fiber-optic delay line further comprises an optical pump to compensate for optical losses.

6. The method as set forth in claim 3 wherein the laser operates in a single longitudinal mode.

7. The method as set forth in claim 3 wherein the laser operates in a single transverse mode.

8. The method as set forth in claim 2 wherein the coherent wave is electromagnetic radiation with a wavelength in the range of about 30 to 1000 microns.

9. The method as set forth in claim 2 wherein the spatial modulating of each coherent wavelet is accomplished with a rotatable planar reflector, each known different amount of spatial modulation of each coherent wavelet being produced by rotating the planar reflector a different angular amount.

10. The method as set forth in claim 2 wherein the spatial modulating of each coherent wavelet is accomplished with a liquid crystal device.

11. The method as set forth in claim 2 wherein the spatial modulating of each coherent wavelet is accomplished with an acousto-optic device.

12. The method as set forth in claim 2 wherein each modulated wavelet is directed to the sample by an optical lens.

13. The method as set forth in claim 2 wherein each modulated wavelet is directed to the sample by a waveguide.

14. The method as set forth in claim 13 wherein each modulated wavelet is coupled into the waveguide by a grating coupler.

15. The method as set forth in claim 14 wherein the grating coupler further comprises a plurality of diffraction gratings.

16. The method as set forth in claim 15 wherein each modulated wavelet is transmitted through the sample.

17. The method as set forth in claim 15 wherein each modulated wavelet is reflected from the sample.

18. The method as set forth in claim 2 wherein each sample image is constructed from each perturbed wavelet spatial phase map by a computational device programmed with an image construction program, the computational device is connected to one or more detector systems which create the perturbed wavelet spatial phase map.

19. The method as set forth in claim 18 wherein each of the one or more detector systems comprise a digital camera connected to a spatial phase measuring system.

20. The method as set forth in claim 2 further comprising the step of stimulating the sample with an external stimulus before the interacting step (c).

21. The method as set forth in claim 20 wherein the external stimulus is chosen from the group consisting of electromagnetic radiation, sound waves, electric fields, magnetic fields, a chemical stimulant, ion beams, electron beams, and combinations thereof.

22. The method as set forth in claim 2 further comprising the step of stimulating the sample with an external stimulus simultaneous with the interacting step (c).

23. The method as set forth in claim 22 wherein the external stimulus is chosen from the group consisting of electromagnetic radiation, sound waves, electric fields, magnetic fields, a chemical stimulant, ion beams, electron beams, and combinations thereof.

24. A system for forming an image of a sample comprising:
- a source that emits a coherent wave of radiation;
- a temporal modulation system positioned to collect the coherent wave, the temporal modulation system temporally divides the coherent wave into a plurality of coherent wavelets;
- a spatial modulation system positioned to collect each coherent wavelet, the spatial modulation system spatially modulates the phase of each coherent wavelet a known different amount thereby producing a plurality of modulated wavelets;
- a radiation transmission system positioned to direct each modulated wavelet to the sample thereby creating a plurality of perturbed wavelets as a result of each modulated wavelet interacting with the sample;
- a detection system positioned to detect each perturbed wavelet, the detection system creates a spatial phase map of each perturbed wavelet; and
- a computational system connected to the detection system, the computational system constructs a plurality of sample images based on the spatial phase map of each perturbed wavelet and statistically averages the plurality of sample images to produce a final averaged image of the sample.

25. The system set forth in claim 24 wherein the temporal modulation system temporally divides the coherent wave into a plurality of coherent wavelets within one coherence length or less of the coherent wave of radiation.

26. The system set forth in claim 25 wherein the source comprises a laser.

27. The system set forth in claim 26 wherein the temporal modulation system comprises a fiber-optic delay line connected to an electronically controlled bleed-off coupling component.

28. The system set forth in claim 27 wherein the fiber-optic line further comprises an optical pump to compensate for optical losses.

29. The system set forth in claim 26 wherein the laser operates in a single longitudinal mode.

30. The system set forth in claim 26 wherein the laser operates in a single transverse mode.

31. The system set forth in claim 25 wherein the coherent wave of radiation has a wavelength in the range of about 30 to 1000 microns.

32. The system set forth in claim 25 wherein the spatial modulation system comprises a planar rotatable reflector, each known different amount of spatial modulation is produced by different angles of rotation of the reflector.

33. The system set forth in claim 25 wherein the spatial modulation system comprises a liquid crystal device.

34. The system set forth in claim 25 wherein the spatial modulation system comprises an acousto-optic device.

35. The system set forth in claim 25 wherein the radiation transmission system comprises an optical lens.

36. The system set forth in claim 25 wherein the radiation transmission system comprises a waveguide.

37. The system set forth in claim 36 wherein the radiation transmission system further comprises a grating coupler, the grating coupler couples the modulated wavelets into the waveguide.

38. The system set forth in claim 37 wherein the grating coupler further comprises a plurality of diffraction gratings.

39. The system set forth in claim 38 wherein each modulated wavelet is transmitted through the sample.

40. The system set forth in claim 38 wherein each modulated wavelet is reflected from the sample.

41. The system set forth in claim 25 wherein the detection system comprises one or more digital cameras connected to a spatial phase measuring system.

42. The system set forth in claim 25 further comprising a sample stimulation system, the sample stimulation system stimulates the sample with an external stimulus before each modulated wavelet interacts with the sample.

43. The system as set forth in claim 42 wherein the external stimulus is chosen from the group consisting of electromagnetic radiation, sound waves, electric fields, magnetic fields, a chemical stimulant, ion beams, electron beams, and combinations thereof.

44. The system set forth in claim 25 further comprising a sample stimulation system, the sample stimulation system stimulates the sample with an external stimulus simultaneous with each modulated wavelet interacting with the sample.

45. The system as set forth in claim 44 wherein the external stimulus is chosen from the group consisting of electromagnetic radiation, sound waves, electric fields, magnetic fields, a chemical stimulant, ion beams, electron beams, and combinations thereof.

* * * * *